(12) United States Patent
Furuta

(10) Patent No.: US 9,915,413 B2
(45) Date of Patent: Mar. 13, 2018

(54) ILLUMINATION APPARATUS

(71) Applicant: Olympus Corporation, Tokyo (JP)

(72) Inventor: Koichiro Furuta, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 295 days.

(21) Appl. No.: 14/323,801

(22) Filed: Jul. 3, 2014

(65) Prior Publication Data
US 2014/0321114 A1    Oct. 30, 2014

Related U.S. Application Data

(63) Continuation of application No. PCT/JP2012/083518, filed on Dec. 25, 2012.

(30) Foreign Application Priority Data

Jan. 12, 2012    (JP) ................. 2012-004115

(51) Int. Cl.
*F21V 9/00*    (2015.01)
*F21V 14/00*    (2018.01)
(Continued)

(52) U.S. Cl.
CPC ............ *F21V 14/00* (2013.01); *G02B 26/007* (2013.01); *G02B 27/1006* (2013.01); *G02B 27/141* (2013.01); *G02B 21/06* (2013.01); *G02B 23/2453* (2013.01)

(58) Field of Classification Search
CPC ... A61B 1/0638; A61B 1/0646; A61B 1/0669; A61B 1/0684; A61B 1/07; F21V 7/00;
(Continued)

(56) References Cited

U.S. PATENT DOCUMENTS 6,899,435 B2 *    5/2005    Yamanaka ............. H04N 9/315
                                                                     348/801
8,757,809 B2 *    6/2014    Jorgensen .............. G03B 33/06
                                                                     353/30
(Continued)

FOREIGN PATENT DOCUMENTS

CN    201 706 387    1/2011
EP    2 388 626    11/2011
(Continued)

OTHER PUBLICATIONS

International Search Report, dated Mar. 19, 2013, issued in corresponding International Application No. PCT/JP2012/083518.

*Primary Examiner* — Tsion Tumebo
(74) *Attorney, Agent, or Firm* — Andrews Kurth Kenyon LLP

(57) ABSTRACT

A light with higher luminance is radiated while lights of a plurality of different wavelengths are appropriately selected and light guiding efficiency is improved. An illumination apparatus including three or more light sources which are arranged so that optical axes of the light sources intersect at one point and which respectively emit lights of different wavelength ranges, an optical device which transmits a light from one of the light sources while reflecting lights from the other light sources so as to make the lights enter an optical path of the light from the one of the light sources, and an optical device rotator which rotates the optical device in a direction in which the light sources are arranged.

19 Claims, 20 Drawing Sheets

(51) Int. Cl.
  *G02B 27/14* (2006.01)
  *G02B 27/10* (2006.01)
  *G02B 26/00* (2006.01)
  *G02B 21/06* (2006.01)
  *G02B 23/24* (2006.01)

(58) Field of Classification Search
  CPC ... G01N 2021/6419; G01N 2021/6471; G01N 21/645; G01N 2201/061; G02B 21/16; G02B 23/2469; G02B 27/1006; G02B 27/141; G02B 6/0006; G03B 21/14
  USPC ........................................................ 362/231
  See application file for complete search history.

(56) References Cited

U.S. PATENT DOCUMENTS

| | | | | |
|---|---|---|---|---|
| 8,974,064 | B2 * | 3/2015 | Maeda | G03B 21/2013 353/52 |
| 2004/0207816 | A1 * | 10/2004 | Omoda | G03B 21/2013 353/31 |
| 2005/0254019 | A1 * | 11/2005 | Magarill | G02B 27/0927 353/97 |
| 2006/0007407 | A1 * | 1/2006 | Matsui | G02B 26/008 353/84 |
| 2007/0127240 | A1 * | 6/2007 | Inamoto | F21K 9/00 362/242 |
| 2008/0106787 | A1 * | 5/2008 | Tsutsui | G02B 6/4206 359/385 |
| 2010/0302631 | A1 | 12/2010 | Hing et al. | |
| 2011/0286212 | A1 * | 11/2011 | Furuta | A61B 1/0638 362/231 |

FOREIGN PATENT DOCUMENTS

| | | |
|---|---|---|
| JP | 05-066366 | 3/1993 |
| JP | 2001-042431 | 2/2001 |
| JP | 2003-344948 | 12/2003 |
| JP | 2004-138866 | 5/2004 |

* cited by examiner

US 9,915,413 B2

ILLUMINATION APPARATUS

CROSS-REFERENCE TO RELATED APPLICATIONS

This application is a Continuation application of International Application PCT/JP2012/083518 filed on Dec. 25, 2012, which claims priority to Japanese Application No. 2012-004115 filed on Jan. 12, 2012. The Contents of International Application PCT/JP2012/083518 and Japanese application No. 2012-004115 are hereby incorporated by reference herein in its entirety.

TECHNICAL FIELD

The present invention relates to an illumination apparatus.

BACKGROUND ART

Conventionally, so-called fluorescent observation has been widely performed, including, in a microscope system, radiating a light of a specific wavelength to an observation target to which a fluorescent reagent is applied to thereby excite the fluorescent reagent and detect and observe fluorescence emitted from the observation target, and, in an endoscopic device, detecting or observing fluorescence emitted from a living body by a light of a specific wavelength being radiated to an observation target.

In the fluorescent observation, in order to efficiently detect fluorescence from the observation target, it is necessary to radiate a light having a wavelength according to excitation light characteristics of the fluorescent reagent or the living body. Because the excitation light characteristics differ for each fluorescent reagent or living body, an illumination apparatus applied to the microscope system and the endoscopic device is configured to be able to perform illumination with lights of a plurality of different wavelengths according to various excitation light characteristics.

PTL 1 discloses one example of such an illumination apparatus which includes three light sources (LEDs) and two dichroic mirrors, and which can output a light while selecting a wavelength of a light to be radiated to an observation target by switching the light sources appropriately and synthesizing colors of a plurality of wavelengths using the dichroic mirrors.

CITATION LIST

Patent Literature

{PTL 1}
Japanese Unexamined Patent Application, Publication No. 2001-42431

SUMMARY OF INVENTION

Technical Problem

However, with the illumination apparatus disclosed in PTL 1, a plurality of dichroic mirrors are used to synthesize colors of lights of a plurality of wavelengths. More specifically, dichroic mirrors of a number one less than the number of light sources are disposed. Therefore, lights emitted from at least one light source have to be transmitted through the dichroic mirrors of the number one less than the number of the light sources. Accordingly, because the amount of the light emitted from the light sources is lost every time the lights are transmitted through the dichroic mirrors, light guiding efficiency becomes low, and thus a sufficient amount of light cannot be obtained at the observation target.

The present invention has been made in view of such circumstances, and is directed to provide an illumination apparatus which can radiate a light with higher luminance by appropriately selecting lights of a plurality of different wavelengths while improving light guiding efficiency.

Solution to Problem

To solve the above-described problem, the present invention employs the following solutions.

One aspect of the present invention provides an illumination apparatus including three or more light sources which are arranged so that optical axes of light sources intersect at one point and which respectively emit lights of different wavelength ranges, an optical device which transmits a light from one of the light sources, while reflecting lights from the other light sources so as to make the lights enter an optical path of the light from the one of the light sources, and an optical device rotator which rotates the optical device in a direction in which the light sources are arranged.

DESCRIPTION OF EMBODIMENTS

First Embodiment

An illumination apparatus 1 according to a first embodiment will be described below with reference to the drawings.

Figure 1:
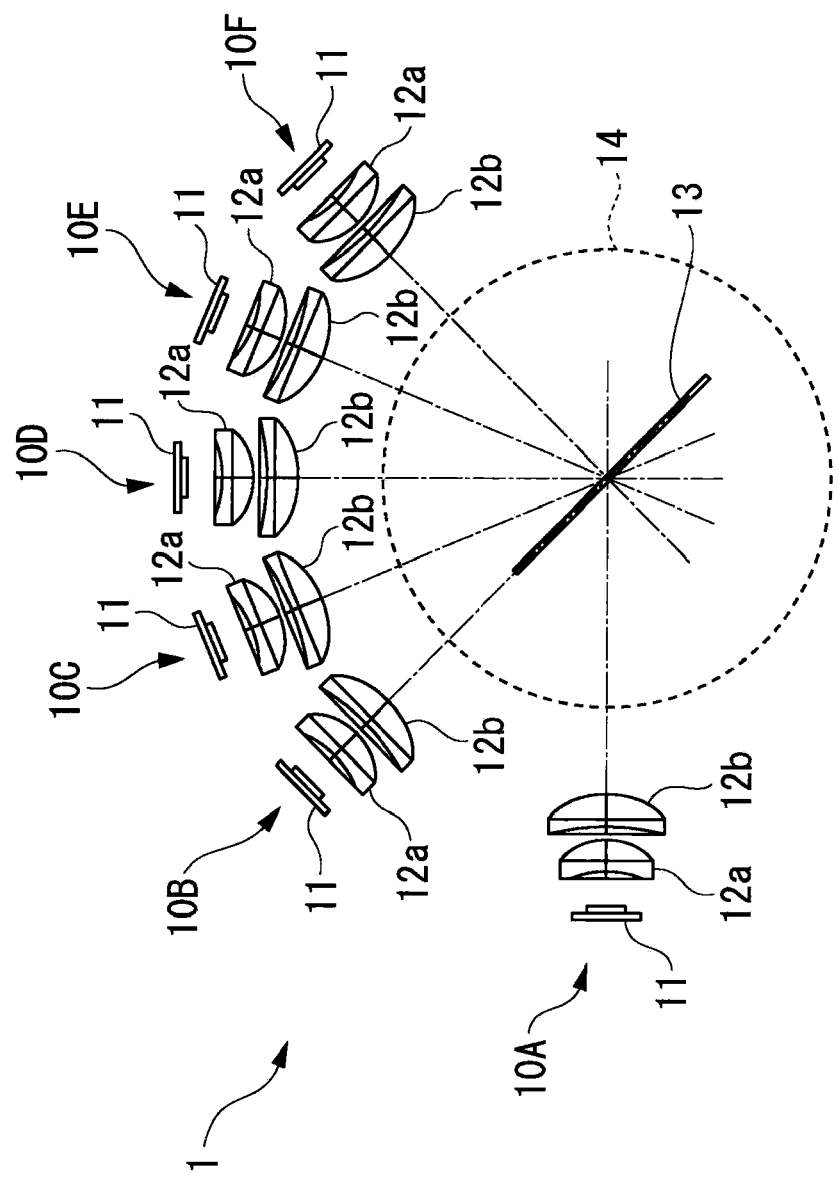
FIG. 1 is a schematic configuration diagram of an illumination apparatus according to a first embodiment.

As illustrated in FIG. 1, the illumination apparatus 1 according to this embodiment includes six light sources 10A, 10B, 10C, 10D, 10E and 10F, a dichroic mirror (optical device) 13 which transmits a light from one of the light sources 10A, 10B, 10C, 10D, 10E and 10F while reflecting lights from the other light sources, a rotating mechanism (optical device rotator) 14 which rotates the dichroic mirror 13 around a rotation axis of the dichroic mirror 13, and a control unit (not illustrated) which controls a rotation angle of the dichroic mirror rotated by the rotating mechanism 14.

Each of the light sources 10A, 10B, 10C, 10D, 10E and 10F includes a light emitting device 11 such as an LED and collimator lenses 12a and 12b which parallelize lights emitted from the light emitting device 11. The light sources 10B, 10C, 10D, 10E and 10F are arranged so that optical axes of the light sources intersect at one point on the dichroic mirror 13, and are disposed in a circular shape at equal intervals from a left side of FIG. 1.

It should be noted that intervals at which the light sources 10A, 10B, 10C, 10D, 10E and 10F are disposed are not necessarily equal, as long as the light sources may be disposed so that optical axes of lights emitted from the light sources 10A, 10B, 10C, 10D, 10E and 10F intersect at one point. Further, while each of the light sources includes the light emitting device 11 and the collimator lenses 12a and 12b in this embodiment, the configuration of the present invention is not limited to this configuration, and may be a configuration, for example, where the collimator lenses 12a and 12b are not provided.

That is, in FIG. 1, the light source 10A is disposed at a left end, and the light source 10D is disposed at a position which forms an angle of 90° with respect to an optical path direction of the light source 10A. The light source 10B is disposed between the light source 10A and the light source 10D at a position which is inclined by 45° respectively from the light source 10A and the light source 10D around a rotation axis of the dichroic mirror 13. Further, the light source 10C is disposed between the light source 10B and the light source 10D at a position respectively inclined by 22.5° respectively from the light source 10B and the light source 10D around the rotation axis of the dichroic mirror 13. Still further, the light source 10F is disposed at a position inclined by 45° in a direction away from the light source 10A with respect to the light source 10D around the rotation axis of the dichroic mirror 13. Further, the light source 10E is disposed between the light source 10D and the light source 10F at a position inclined by 22.5° respectively from the light source 10D and the light source 10F around the rotation axis of the dichroic mirror 13.

The light sources 10A, 10B, 10C, 10D, 10E and 10F are disposed in a circular shape on the same circumference so that optical paths of the lights from the light sources intersect at the center of the circular shape.

Further, the light sources 10A, 10B, 10C, 10D, 10E and 10F respectively emit lights of different wavelength ranges. Specifically, the light source 10A emits a light of 400 nm, the light source 10B emits a light of 550 nm, the light source 10C emits a light of 600 nm, the light source 10D emits a light of 650 nm, the light source 10E emits a light of 700 nm, and the light source 10F emits a light of 750 nm. In this embodiment, because the dichroic mirror 13 which will be described later, has so-called short-path characteristics, the light sources 10B, 10C, 10D, 10E and 10F are disposed in a circular shape at equal intervals in ascending order of the wavelength range from the left side of FIG. 1.

The dichroic mirror 13 which has so-called short-path characteristics, is disposed at the center of the light sources 10A, 10B, 10C, 10D, 10E and 10F disposed in a circular shape, that is, at a position where the optical paths of the light sources 10A, 10B, 10C, 10D, 10E and 10F intersect, so as to rotate on a central axis of the dichroic mirror 13. The dichroic mirror 13 transmits the light from the light source 10A while reflecting the lights from the light sources 10B, 10C, 10D, 10E and 10F, and makes the reflected lights enter the optical path of the light from the light source 10A.

Here, typically, a dichroic mirror is disposed to be inclined by 45° with respect to an optical axis and emits the reflected light in the same direction as a direction of the incident light to thereby generate a synthesized light. In FIG. 1, because the light from the light source 10A enters in a state where the dichroic mirror 13 is inclined by 45° with respect to the optical path of the light source 10A, and enters at 45° with respect to a normal of the dichroic mirror 13, an angle of incidence becomes 45°. When the dichroic mirror 13 has short-path characteristics, the light emitted from the light source 10A is required to have a wavelength shorter than the wavelengths of the lights reflected by the dichroic mirror 13. In a case of the dichroic mirror having long-path characteristics, the light emitted from the light source 10A is required to have a wavelength longer than the wavelengths of the lights reflected by the dichroic mirror 13.

Figure 2:
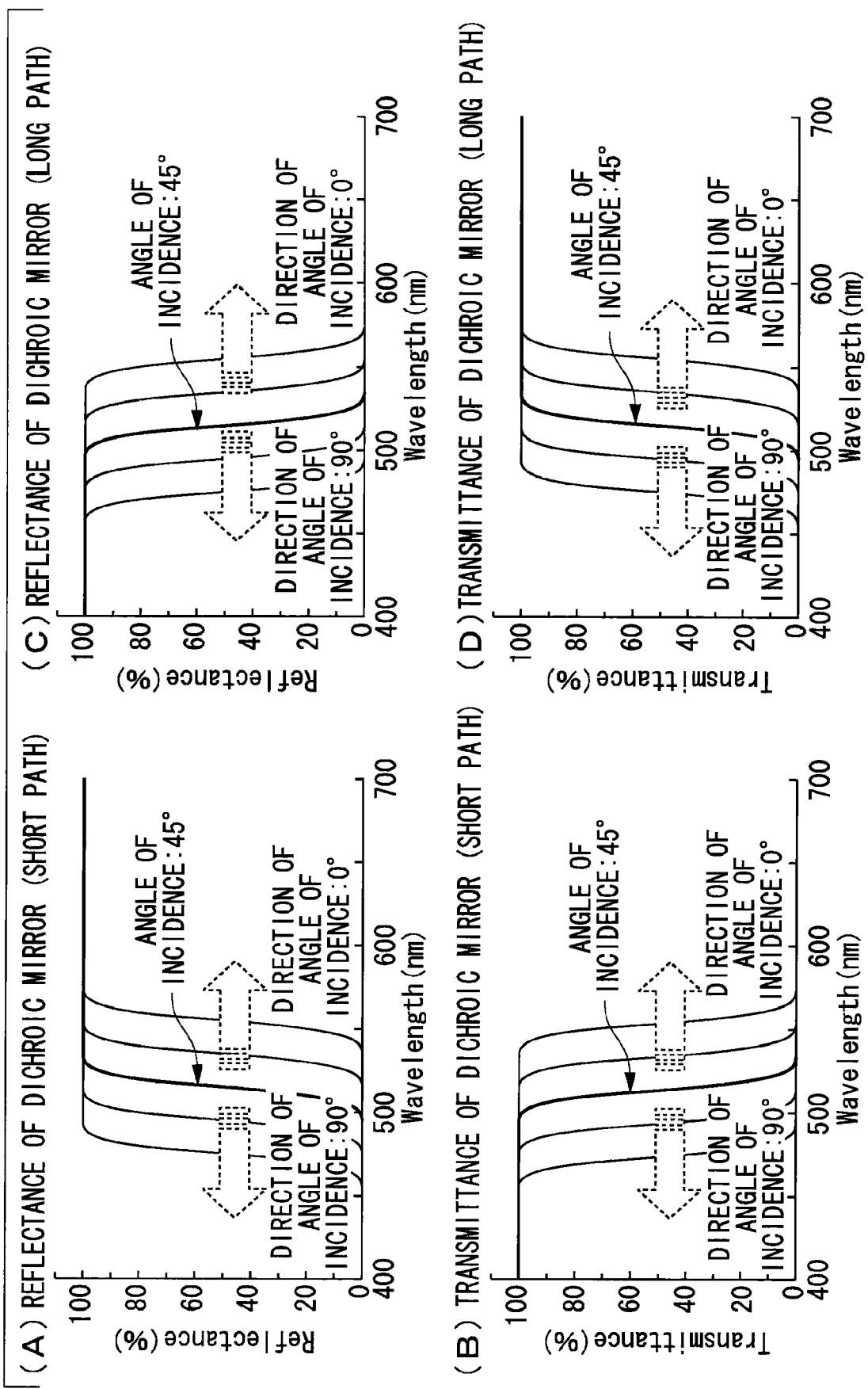
FIG. 2 are graphs illustrating optical characteristics of a dichroic mirror.

Further, the reflection and transmission characteristics of the dichroic mirror shift according to the angle of incidence. FIG. 2 illustrates optical characteristics of the dichroic mirror. As illustrated in FIG. 2, when the angle of incidence becomes less than 45°, the optical characteristics, that is, the reflectance characteristics and the transmittance characteristics of the dichroic mirror both shift to a longer wavelength side compared to a case where the angle of incidence is 45°. Conversely, when the angle of incidence becomes larger than 45°, the characteristics shift to a shorter wavelength side. The sum of the reflectance and transmittance of the dichroic mirror is approximately 100% except for a Fresnel loss at the dichroic mirror. That is, the sum of the reflectance in FIG. 2(A) and the transmittance in FIG. 2(B) is always approximately 100% at any wavelength.

In this embodiment, because the dichromic mirror 13 has short-path characteristics and the light source 10A emits a light which is transmitted through the dichroic mirror, when the dichroic mirror rotates clockwise around its rotation axis, the angle of incidence becomes small, and thus the transmission characteristics shift to a longer wavelength side. Further, the reflectance characteristics of the light sources 10B, 10C, 10D, 10E and 10F disposed in a circular shape also shift to a longer wavelength side according to a rotation angle of the dichroic mirror 13. Accordingly, by making the wavelengths of the lights reflected by the dichroic mirror 13 longer in accordance with an increase of the clockwise rotation angle of the dichroic mirror 13, it is possible to efficiently perform illumination without being affected by oblique incidence characteristics of the dichroic mirror. For the above-described reasons, in this embodiment, the light sources 10B, 10C, 10D, 10E and 10F are disposed in a circular shape at equal intervals in ascending order of the wavelength range from the left side of FIG. 1.

It should be noted that when the dichroic mirror 13 has long-path characteristics, by changing the positions of the light sources 10B, 10C, 10D, 10E and 10F, it is possible to synthesize colors and perform illumination without deteriorating light guiding efficiency of the transmitted light and the reflected light.

The rotating mechanism 14 adjusts inclination of the dichroic mirror 13 by rotating the dichroic mirror 13 by a predetermined rotation angle in a direction in which the light sources 10A, 10B, 10C, 10D, 10E and 10F are arranged based on a control signal from a control unit which will be described later. The rotating mechanism 14 may be configured by using a motor or the like.

The control unit generates a control signal so that the rotating mechanism 14 can adjust the rotation angle of the dichroic mirror 13 so as to make the lights from the light sources 10B, 10C, 10D, 10E and 10F enter the optical path of the light from the light source 10A at a desired angle of incidence, and outputs the control signal to the rotating mechanism 14. By this means, the dichroic mirror 13 is controlled to have a desired rotation angle by the rotating mechanism 14. Further, the control unit controls turning-on and turning-off of the light sources 10A, 10B, 10C, 10D, 10E and 10F.

Figure 3:
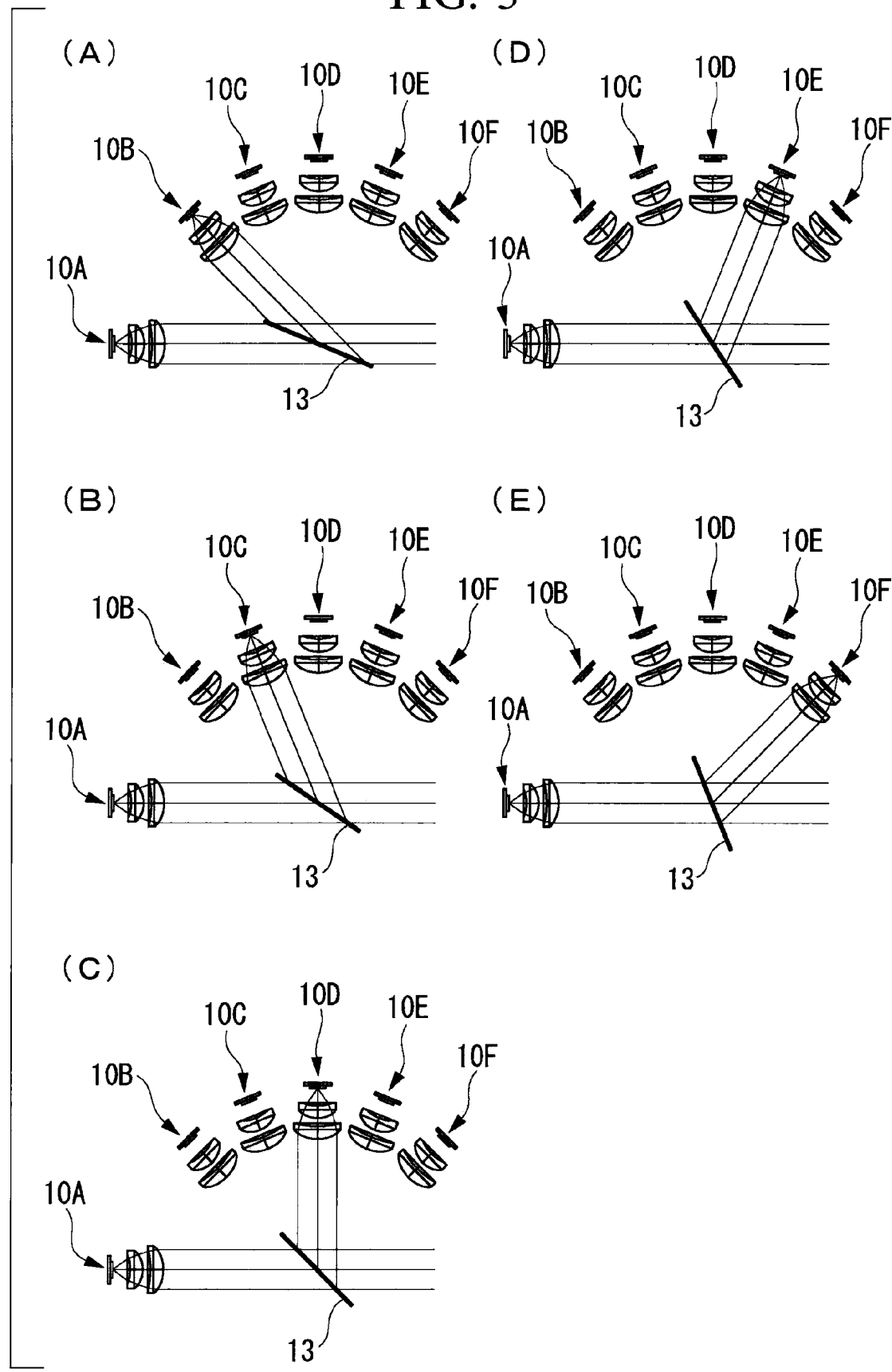
FIG. 3 illustrates an aspect where the dichroic mirror rotates when a synthesized light is generated in the illumination apparatus according to the first embodiment.
Figure 4:
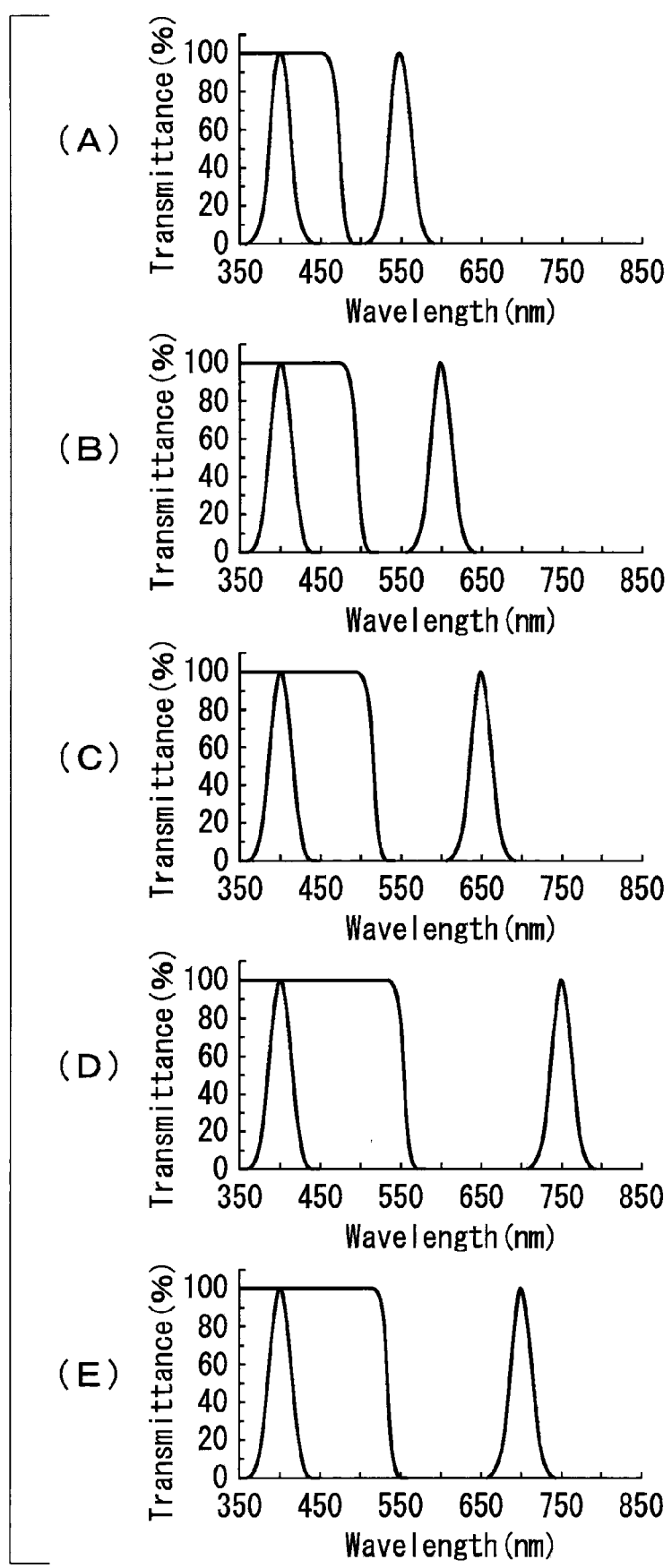
FIG. 4 illustrates transmittance characteristics of the dichroic mirror in the illumination apparatus according to the first embodiment.
Figure 5:
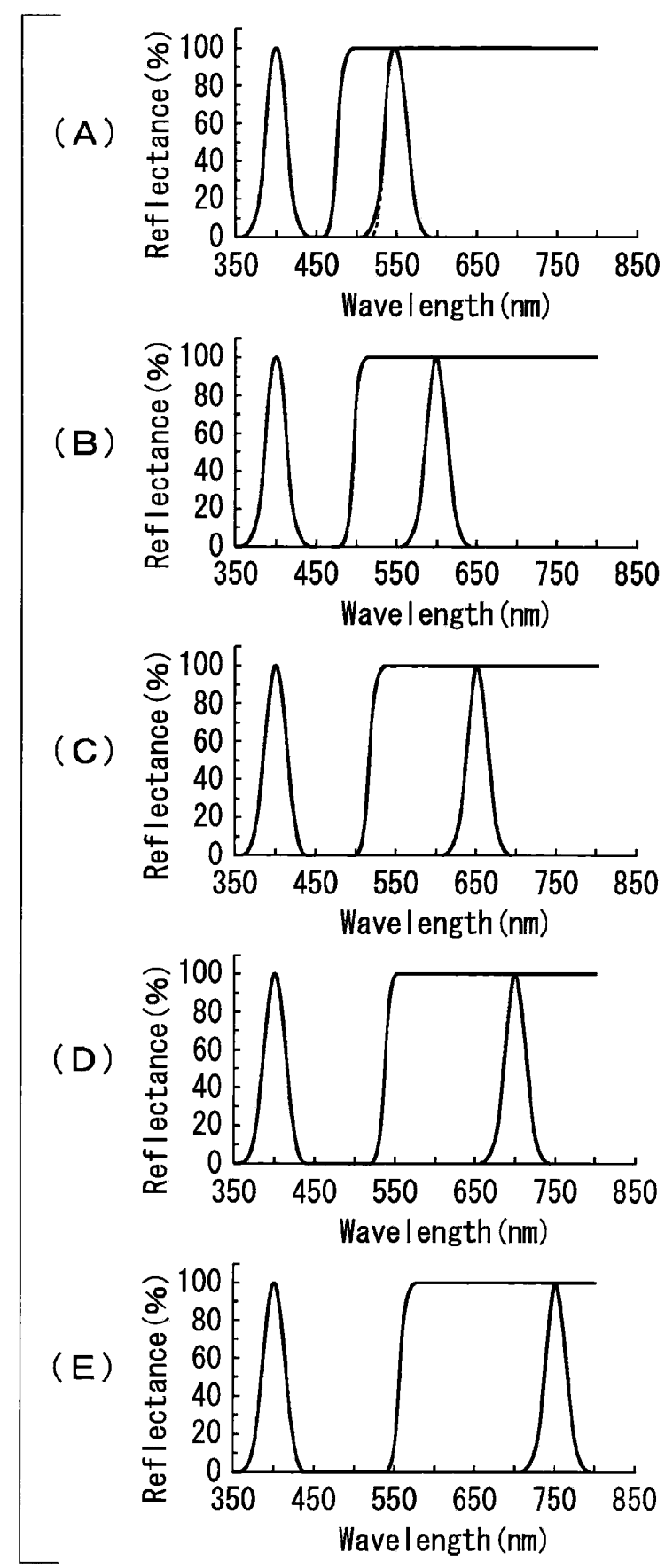
FIG. 5 illustrates reflectance characteristics of the dichroic mirror in the illumination apparatus according to the first embodiment.

A case where, in the illumination apparatus 1 configured as described above, a synthesized light of, for example, the light from the light source 10A and a light selected from the lights from the light sources 10B, 10C, 10D, 10E and 10F is generated and radiated will be described below with reference to FIG. 3, FIG. 4 and FIG. 5.

FIG. 3(A) illustrates an example of a case where a synthesized light of the light from the light source 10A and the light from the light source 10B is generated, in which the dichroic mirror 13 rotates anticlockwise by 22.5° around the rotation axis of the dichroic mirror 13 from a state where the dichroic mirror 13 is inclined by 45° with respect to an optical path direction of the light source 10A. The optical characteristics of the dichroic mirror 13 at this time are as illustrated in FIG. 4(A) and FIG. 5(A). Accordingly, the light from the light source 10A is transmitted through the dichroic mirror 13, while the light from the light source 10B is reflected by the dichroic mirror 13, and thereby the synthesized light is generated.

FIG. 3(B) illustrates an example where a synthesized light of the light from the light source 10A and the light from the light source 10C is generated, in which the dichroic mirror 13 rotates anticlockwise by 11.25° from a state where the dichroic mirror 13 is inclined by 45°. The optical characteristics of the dichroic mirror 13 at this time are as illustrated in FIG. 4(B) and FIG. 5(B). Accordingly, the light from the light source 10A is transmitted through the dichroic mirror 13, while the light from the light source 10C is reflected by the dichroic mirror 13, and thereby the synthesized light is generated.

FIG. 3(C) illustrates an example where a synthesized light of the light from the light source 10A and the light from the light source 10D is generated, in which the dichroic mirror is inclined by 45°. The optical characteristics of the dichroic mirror 13 are as illustrated in FIG. 4(C) and FIG. 5(C). Accordingly, the light from the light source 10A is transmitted through the dichroic mirror 13, while the light from the light source 10D is reflected by the dichroic mirror 13, and thereby the synthesized light is generated.

FIG. 3(D) illustrates an example where a synthesized light of the light from the light source 10A and the light from the light source 10E is generated, in which the dichroic mirror 13 rotates clockwise by 11.25° from a state where the dichroic mirror 13 is inclined by 45°. The optical characteristics of the dichroic mirror 13 are as illustrated in FIG. 4(D) and FIG. 5(D). Accordingly, the light from the light source 10A is transmitted through the dichroic mirror 13, while the light from the light source 10E is reflected by the dichroic mirror 13, and thereby the synthesized light is generated.

FIG. 3(E) illustrates an example where a synthesized light of the light from the light source 10A and the light from the light source 10F is generated, in which the dichroic mirror 13 rotates clockwise by 22.50° from a state where the dichroic mirror 13 is inclined by 45°. The optical characteristics of the dichroic mirror 13 are as illustrated in FIG. 4(E) and FIG. 5(E). Accordingly, the light from the light source 10A is transmitted through the dichroic mirror 13, while the light from the light source 10F is reflected by the dichroic mirror 13, and thereby the synthesized light is generated.

According to this embodiment, while the light from the light source 10A is transmitted through the dichroic mirror 13 and passes through the transmission optical path which goes straight, when the rotation angle of the dichroic mirror 13 rotated by the rotating mechanism 14 is adjusted by actuation of the control unit, a light from any one of the other light sources 10B, 10C, 10D, 10E and 10F is reflected by the dichroic mirror 13 and enters the transmission optical path of the light from the light source 10A. When the rotation angle of the dichroic mirror 13 is switched by the rotating mechanism 14, the light source which emits a light entering the transmission optical path can be switched. That is, it is possible to make one of the lights from three or more light sources 10A, 10B, 10C, 10D, 10E and 10F enter one optical path with one dichroic mirror 13, so that it is possible to suppress loss of lights upon transmission or reflection of the lights. Accordingly, it is possible to perform illumination with a light with higher luminance by appropriately selecting lights of a plurality of different wavelengths while improving light guiding efficiency.

Modification of First Embodiment

An illumination apparatus 2 according to modification of the first embodiment will be described below.

This modification differs from the above-described illumination apparatus in the first embodiment only in characteristics of the dichroic mirror. Accordingly, because the positions where the light sources are disposed are the same as those in the first embodiment, this modification will be described with reference to FIG. 3. That is, while the dichroic mirror 13 in the first embodiment has short-path characteristics, a dichroic mirror having long-path characteristics is applied in this modification. Therefore, as the light source 10A, the light source having the longest wavelength range among the six light sources is applied. Specifically, for example, the light source 10A having a wavelength of 750 nm, the light source 10B having a wavelength of 400 nm, the light source 10C having a wavelength of 450 nm, the light source 10D having a wavelength of 500 nm, the light source 10E having a wavelength of 550 nm, and the light source 10F having a wavelength of 600 nm are applied.

Figure 6:
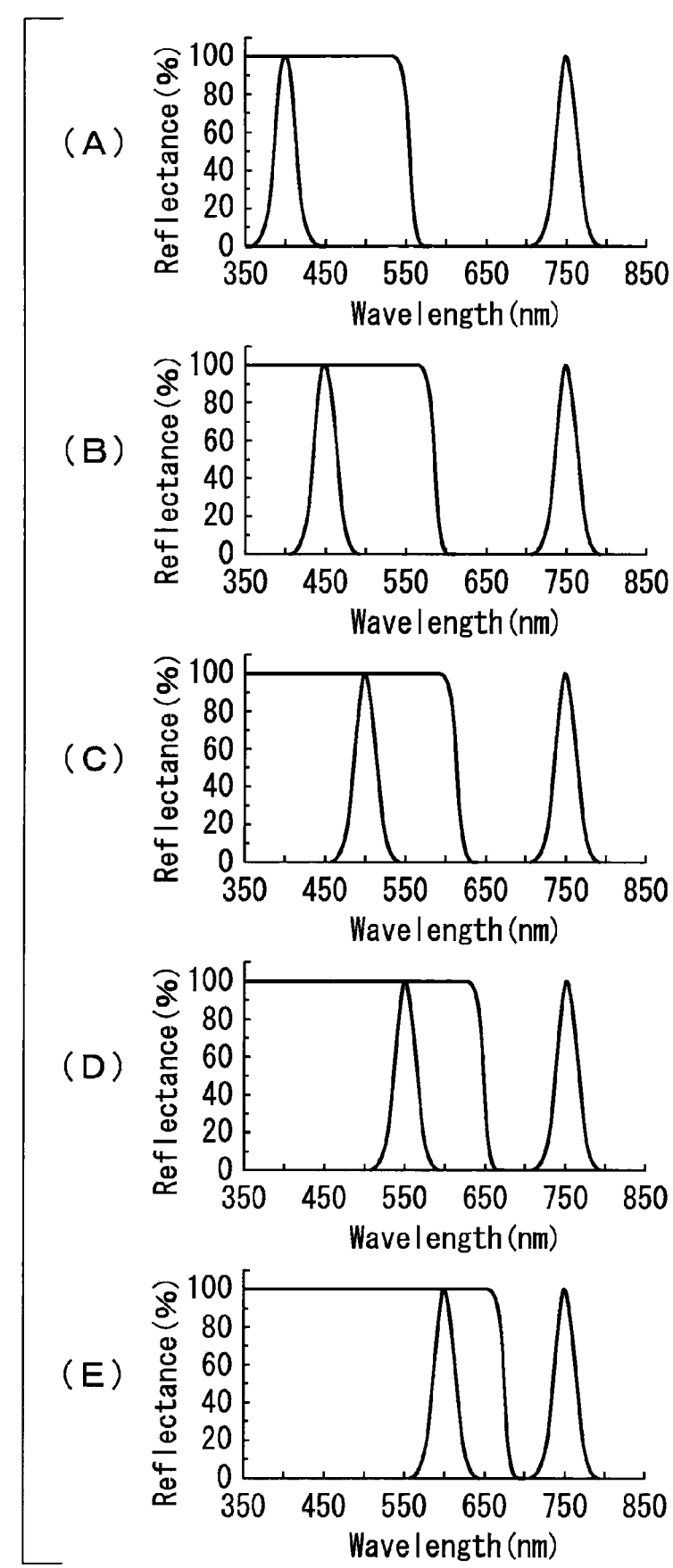
FIG. 6 illustrates reflectance characteristics of a dichroic mirror in an illumination apparatus according to modification of the first embodiment.
Figure 7:
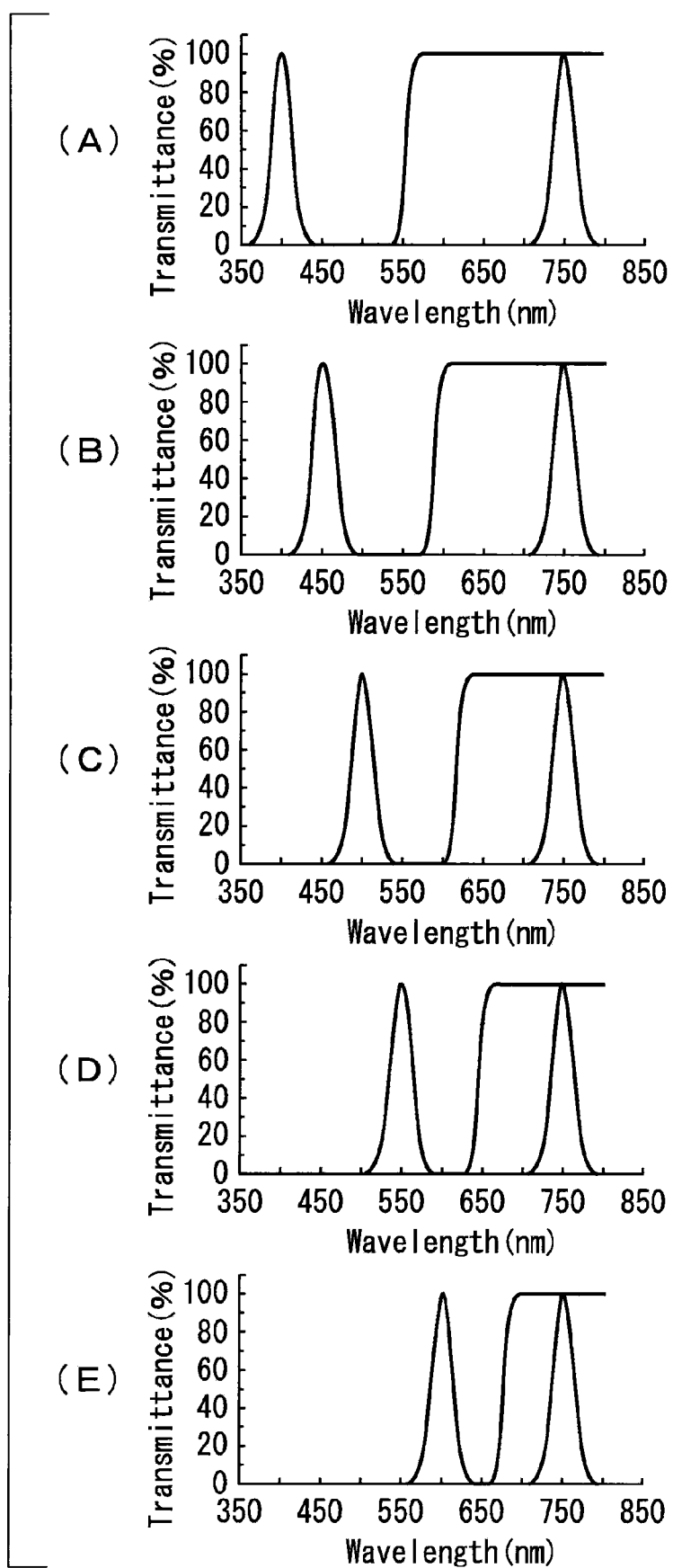
FIG. 7 illustrates transmittance characteristics of the dichroic mirror in the illumination apparatus according to the modification of the first embodiment.

Hereinafter, a case where in the illumination apparatus configured as described above, for example, a synthesized light of a light from the light source 10A and a light selected from lights from the light sources 10B, 10C, 10D, 10E and 10F is generated and radiated will be described with reference to FIG. 3, FIG. 6 and FIG. 7.

FIG. 3(A) illustrates an example of a case where a synthesized light of the light from the light source 10A and the light from the light source 10B is generated, in which the dichroic mirror 13 rotates anticlockwise by 22.5° from a state where the dichroic mirror is inclined by 45°. The optical characteristics of the dichroic mirror at this time are as illustrated in FIG. 6(A) and FIG. 7(A). Accordingly, the light from the light source 10A is transmitted through the dichroic mirror 13, while the light from the light source 10B is reflected by the dichroic mirror 13, and thereby the synthesized light is generated.

FIG. 3(B) illustrates an example where a synthesized light of the light from the light source 10A and the light from the light source 10C is generated, in which the dichroic mirror 13 rotates anticlockwise by 11.25° from a state where the dichroic mirror 13 is inclined by 45°. The optical characteristics of the dichroic mirror 13 at this time are as illustrated in FIG. 6(B) and FIG. 7(B). Accordingly, the light from the light source 10A is transmitted through the dichroic mirror 13, while the light from the light source 10C is reflected by the dichroic mirror 13, and thereby the synthesized light is generated.

FIG. 3(C) illustrates an example where the light from the light source 10A and the light from the light source 10D is generated, in which the dichroic mirror 13 is inclined by 45°. The optical characteristics of the dichroic mirror 13 are as illustrated in FIG. 6(C) and FIG. 7(C). Accordingly, the light from the light source 10A is transmitted through the dichroic mirror, while the light from the light source 10D is reflected by the dichroic mirror 13, and thereby illumination is performed with the synthesized light in which color is synthesized.

FIG. 3(D) illustrates an example where a synthesized light of the light from the light source 10A and the light from the light source 10E is generated, in which the dichroic mirror 13 rotates clockwise by 11.25° from a state where the dichroic mirror 13 is inclined by 45°. The optical characteristics of the dichroic mirror 13 are as illustrated in FIG. 6(D) and FIG. 7(D). Accordingly, the light from the light source 10A is transmitted through the dichroic mirror 13, while the light from the light source 10E is reflected by the dichroic mirror 13, and thereby the synthesized light is generated.

FIG. 3(E) illustrates an example where the light from the light source 10A and the light from the light source 10F is generated, in which the dichroic mirror 13 rotates clockwise by 22.50° from a state where the dichroic mirror 13 is inclined by 45°. The optical characteristics of the dichroic mirror 13 are as illustrated in FIG. 6(E) and FIG. 7(E). Accordingly, the light from the light source 10A is transmitted through the dichroic mirror 13, while the light from the light source 10F is reflected by the dichroic mirror 13, and thereby the synthesized light is generated.

Second Embodiment

An illumination apparatus 2 according to a second embodiment will be described below with reference to the drawings.

Figure 8:
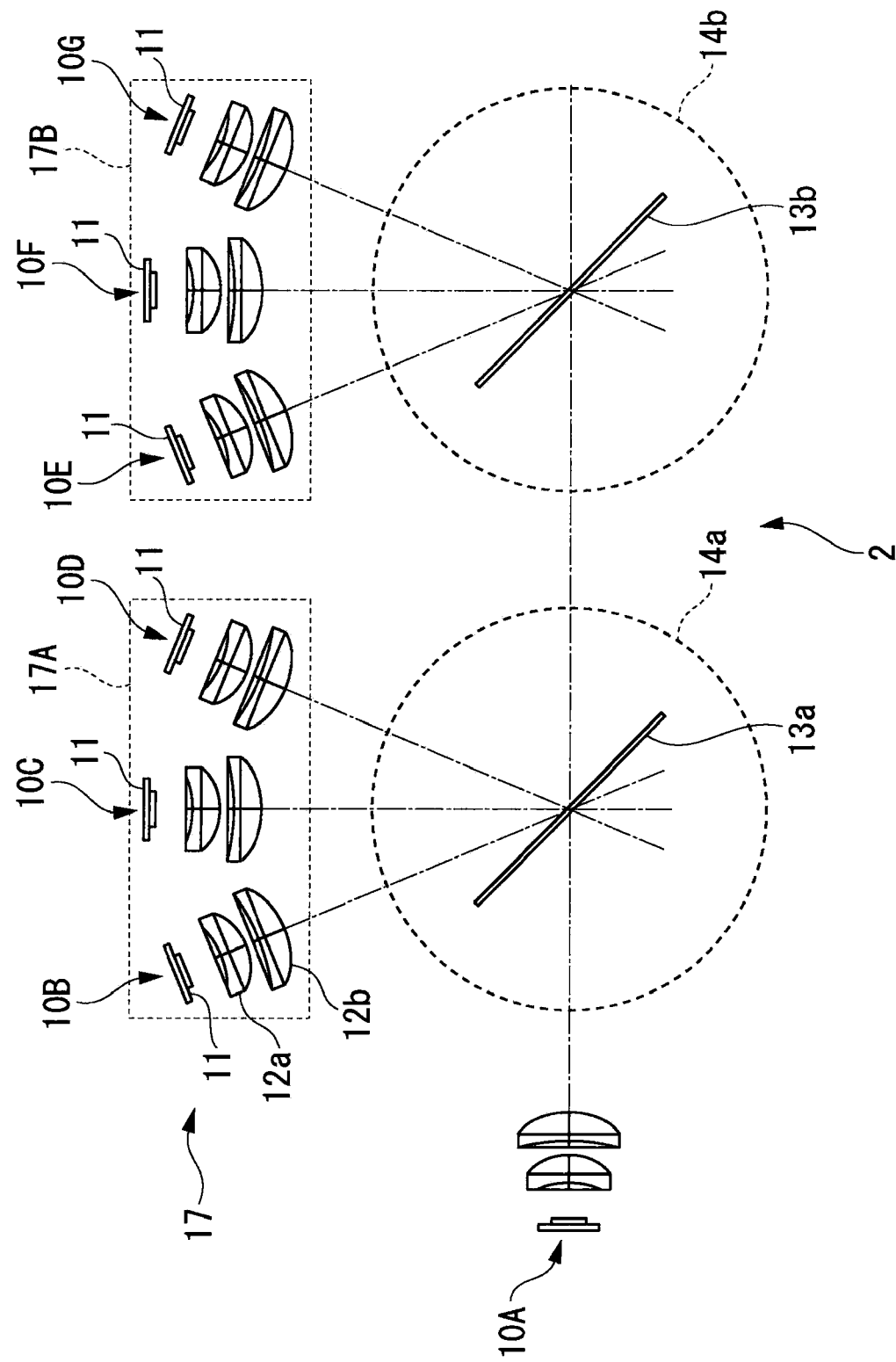
FIG. 8 is a schematic configuration diagram of an illumination apparatus according to a second embodiment.

As illustrated in FIG. 8, the illumination apparatus according to this embodiment includes a light source unit 17 having seven light sources, two dichroic mirrors 13a and 13b, and rotating mechanisms 14a and 14b which rotate the dichroic mirrors 13a and 13b. It should be noted that this embodiment will be described assuming that the dichroic mirrors 13a and 13b have short-path characteristics.

The light source unit 17 includes a light source 10A which emits a light that is transmitted through the dichroic mirrors 13a and 13b, a light source group 17A (light sources 10B, 10C and 10D) and a light source group 17B (light sources 10E, 10F and 10G) which emit lights reflected by the dichroic mirrors 13a and 13b.

The light sources 10B, 10C and 10D configuring the light source group 17A are disposed in a circular shape located on the same circumference so that optical paths of the lights from the light sources intersect at the center of the circular shape. In a similar manner, the light sources 10E, 10F and 10G which configure the light source group 17B are disposed in a circular shape located on the same circumference so that optical paths of the lights from the light sources intersect at the center of the circular shape.

The light source 10A, the light source group 17A and the light source group 17B are disposed so that both a position where the optical paths of the light source group 17A intersect and a position where the optical paths of the light source group 17B intersect are located on the optical path of the light from the light source 10A.

Specifically, in FIG. 8, among the light source group 17A, the light source 10B which emits a light of a wavelength of 450 nm, is disposed to be inclined by 67.5° in an optical path direction of the light source 10A with respect to the light source 10A. The light source 10C which emits a light of 500 nm, is disposed to be inclined by 90° in an optical path direction with respect to the light source 10A. Further, the light source 10D which emits a light of a wavelength of 550 nm is disposed to be inclined by 22.5° in an optical path direction of the light source 10A with respect to the light source 10C.

In a similar manner, among the light source group 17B, the light source 10E which emits a light of a wavelength of 600 nm, is disposed to be inclined by 67.5° in an optical path direction of the light source 10A with respect to the light source 10A. The light source 10F which emits a light of a wavelength of 650 nm, is disposed to be inclined by 90° in an optical path direction with respect to the light source 10A. Further, the light source 10G which emits a light of a wavelength of 700 nm, is disposed to be inclined by 22.5° in an optical path direction of the light source 10A with respect to the light source 10C.

The dichroic mirror 13a is disposed at a position where the optical paths of the light source group 17A intersect, while the dichroic mirror 13b is disposed at a position where the optical paths of the light source group 17B intersect.

Hereinafter, examples of a case where in the illumination apparatus 2 configured as described above, a synthesized light of the light from the light source 10A and a light selected from the lights from the light sources 10B, 10C, 10D, 10E, 10F and 10G is generated and radiated will be described with reference to FIG. 9 to FIG. 16.

Figure 9:
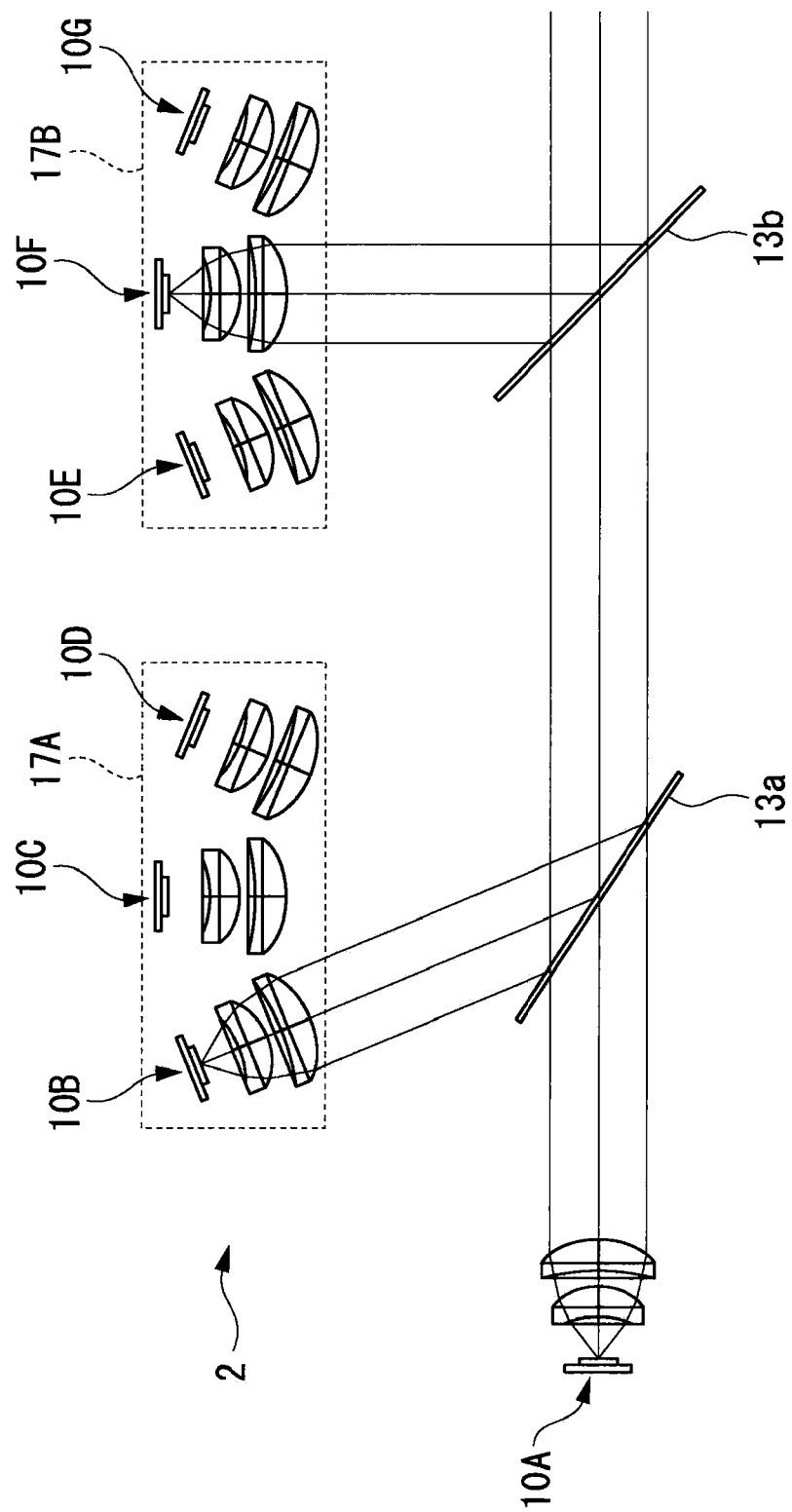
FIG. 9 illustrates an aspect where a dichroic mirror rotates when a synthesized light is generated in the illumination apparatus according to the second embodiment.

FIG. 9 illustrates an example of a case where a synthesized light of the light from the light source 10A and the lights from the light source 10B and the light source 10F is generated, in which the dichroic mirror 13a rotates anti-clockwise by 11.25° from a state where the dichroic mirror 13a is inclined by 45° and the dichroic mirror 13b is inclined by 45°. The optical characteristics of the dichroic mirrors 13a and 13b are as illustrated in FIG. 15(A) and FIG. 16(A).

Accordingly, the light from the light source 10A is transmitted through the dichroic mirror 13 and then transmitted through the dichroic mirror 13b, while the light from the light source 10B is reflected by the dichroic mirror 13a and then transmitted through the dichroic mirror 13b and the light from the light source 10F is reflected by the dichroic mirror 13b, and thereby the synthesized light is generated.

Figure 10:
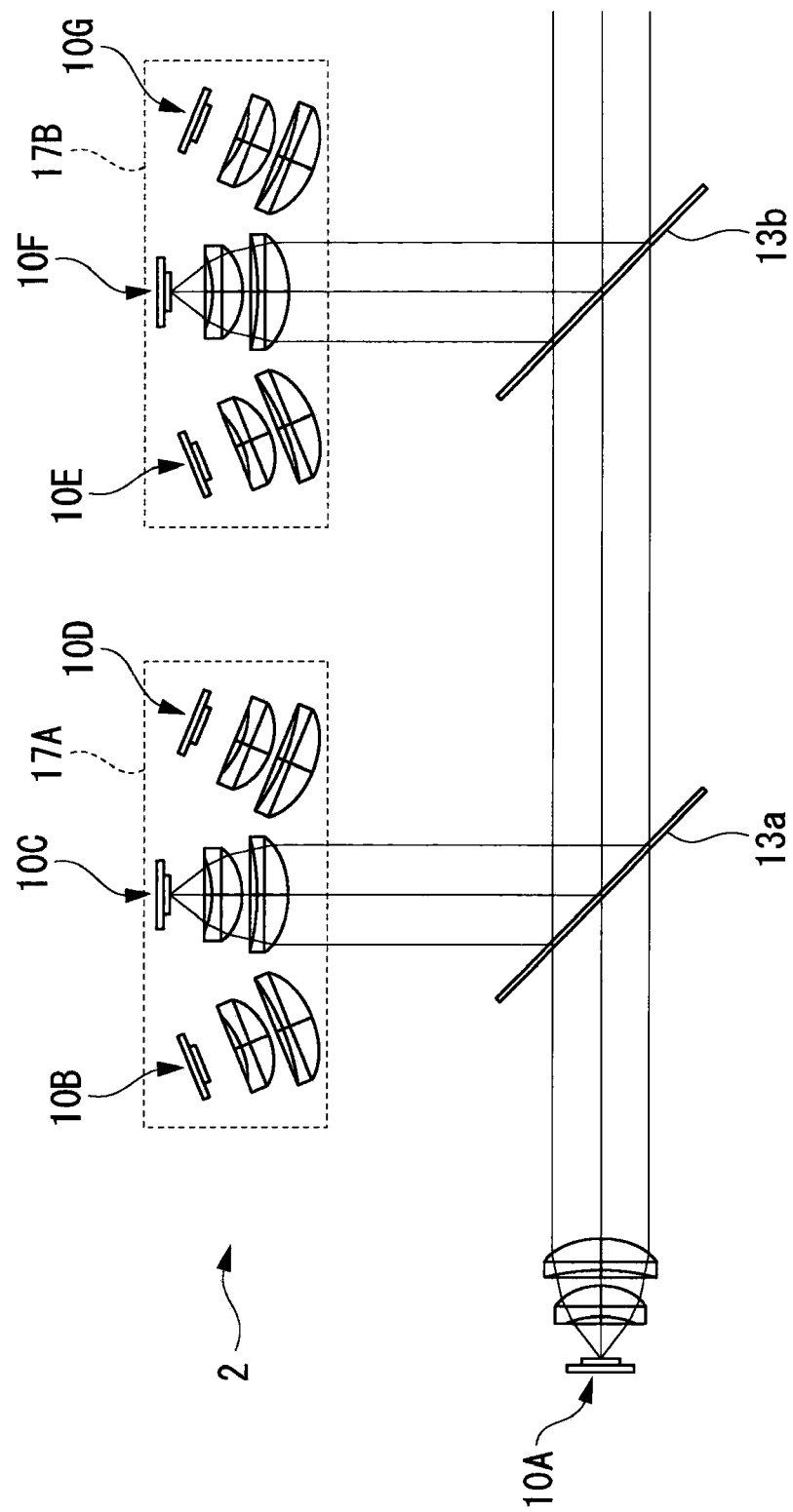
FIG. 10 illustrates an aspect where the dichroic mirror rotates when the synthesized light is generated in the illumination apparatus according to the second embodiment.

FIG. 10 illustrates an example of a case where a synthesized light of the light from the light source 10A and the lights from the light source 10C and the light source 10F is generated, in which the dichroic mirrors 13a and 13b are both inclined by 45°. The optical characteristics of the dichroic mirrors 13a and 13b are as illustrated in FIG. 15(B) and FIG. 16(B).

Accordingly, the light from the light source 10A is transmitted through the dichroic mirror 13a and then transmitted through the dichroic mirror 13b, while the light from the light source 10C is reflected by the dichroic mirror 13a and then transmitted through the dichroic mirror 13b and the light from the light source 10F is reflected by the dichroic mirror 13b, and thereby the synthesized light is generated.

Figure 11:
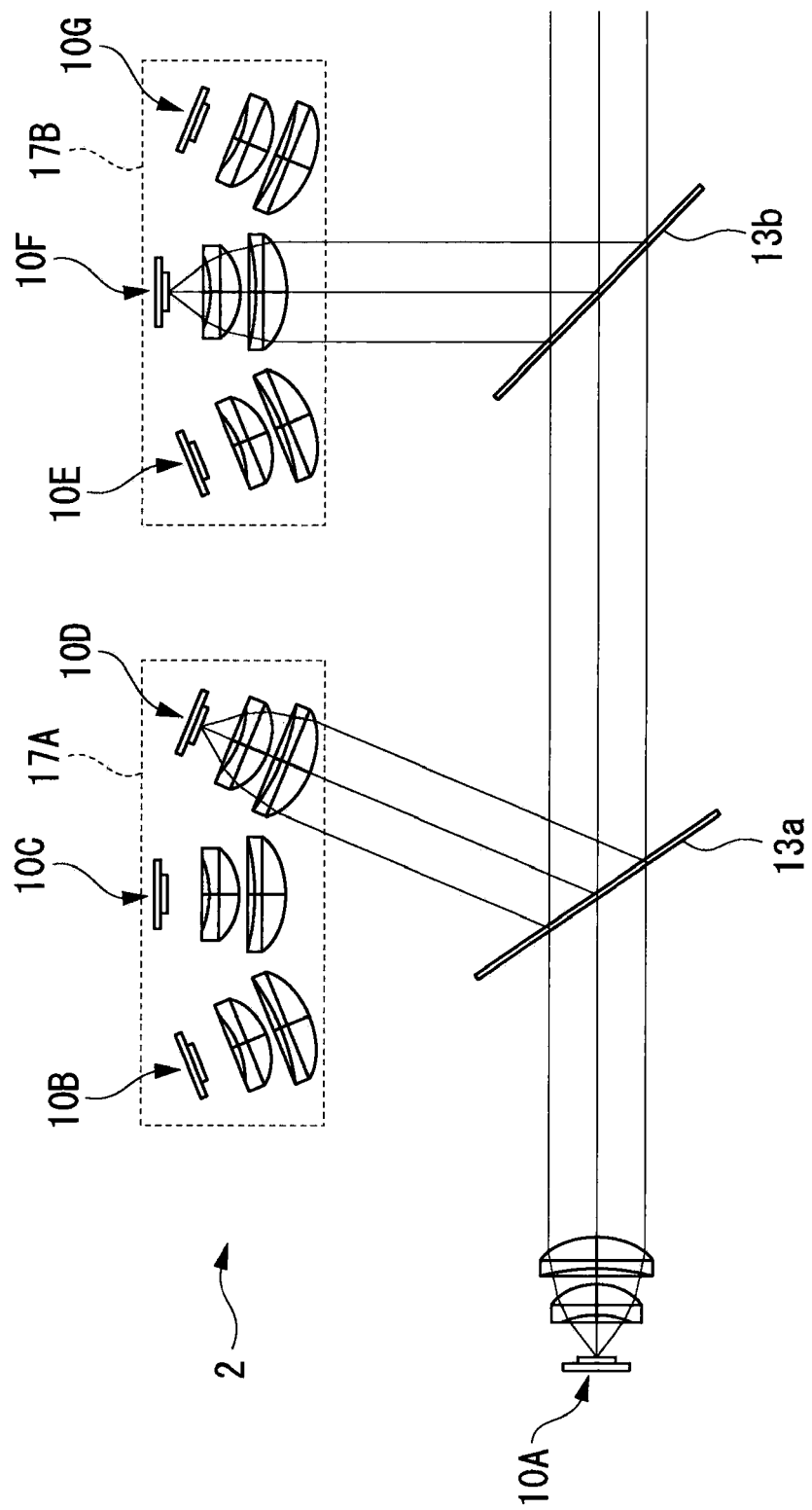
FIG. 11 illustrates an aspect where the dichroic mirror rotates when the synthesized light is generated in the illumination apparatus according to the second embodiment.

FIG. 11 illustrates an example of a case where a synthesized light of the light from the light source 10A and the lights from the light source 10D and the light source 10F is generated, in which the dichroic mirror 13a rotates clockwise by 11.25° from a state where the dichroic mirror 13a is inclined by 45° and the dichroic mirror 13b is inclined by 45°. The optical characteristics of the dichroic mirrors 13a and 13b are as illustrated in FIG. 15(C) and FIG. 16(C).

Accordingly, the light from the light source 10A is transmitted through the dichroic mirror 13a and then transmitted through the dichroic mirror 13b, while the light from the light source 10D is reflected by the dichroic mirror 13a and then transmitted through the dichroic mirror 13b and the light from the light source 10F is reflected by the dichroic mirror 13b, and thereby the synthesized light is generated.

Figure 12:
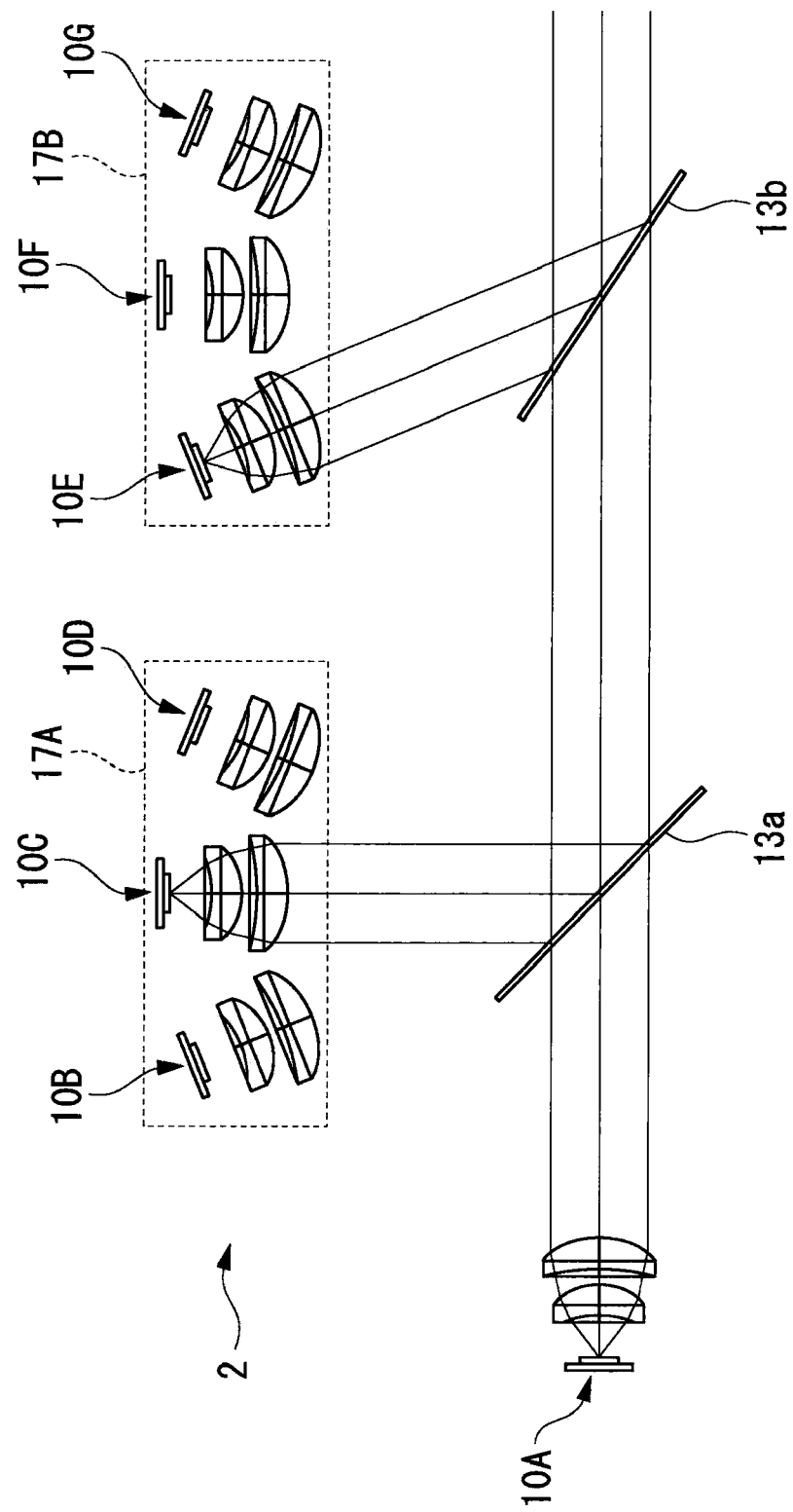
FIG. 12 illustrates an aspect where the dichroic mirror rotates when the synthesized light is generated in the illumination apparatus according to the second embodiment.

FIG. 12 illustrates an example of a case where a synthesized light of the light from the light source 10A and the lights from the light source 10C and the light source 10E is generated, in which the dichroic mirror 13a is inclined by 45° and the dichroic mirror 13b rotates clockwise by 11.25° from a state where the dichroic mirror 13b is inclined by 45°. The optical characteristics of the dichroic mirrors 13a and 13b are as illustrated in FIG. 15(D) and FIG. 16(D).

Accordingly, the light from the light source 10A is transmitted through the dichroic mirror 13a and then transmitted through the dichroic mirror 13b, while the light from the light source 10D is reflected by the dichroic mirror 13a and then transmitted through the dichroic mirror 13b and the light from the light source 10E is reflected by the dichroic mirror 13b, and thereby the synthesized light is generated.

Figure 13:
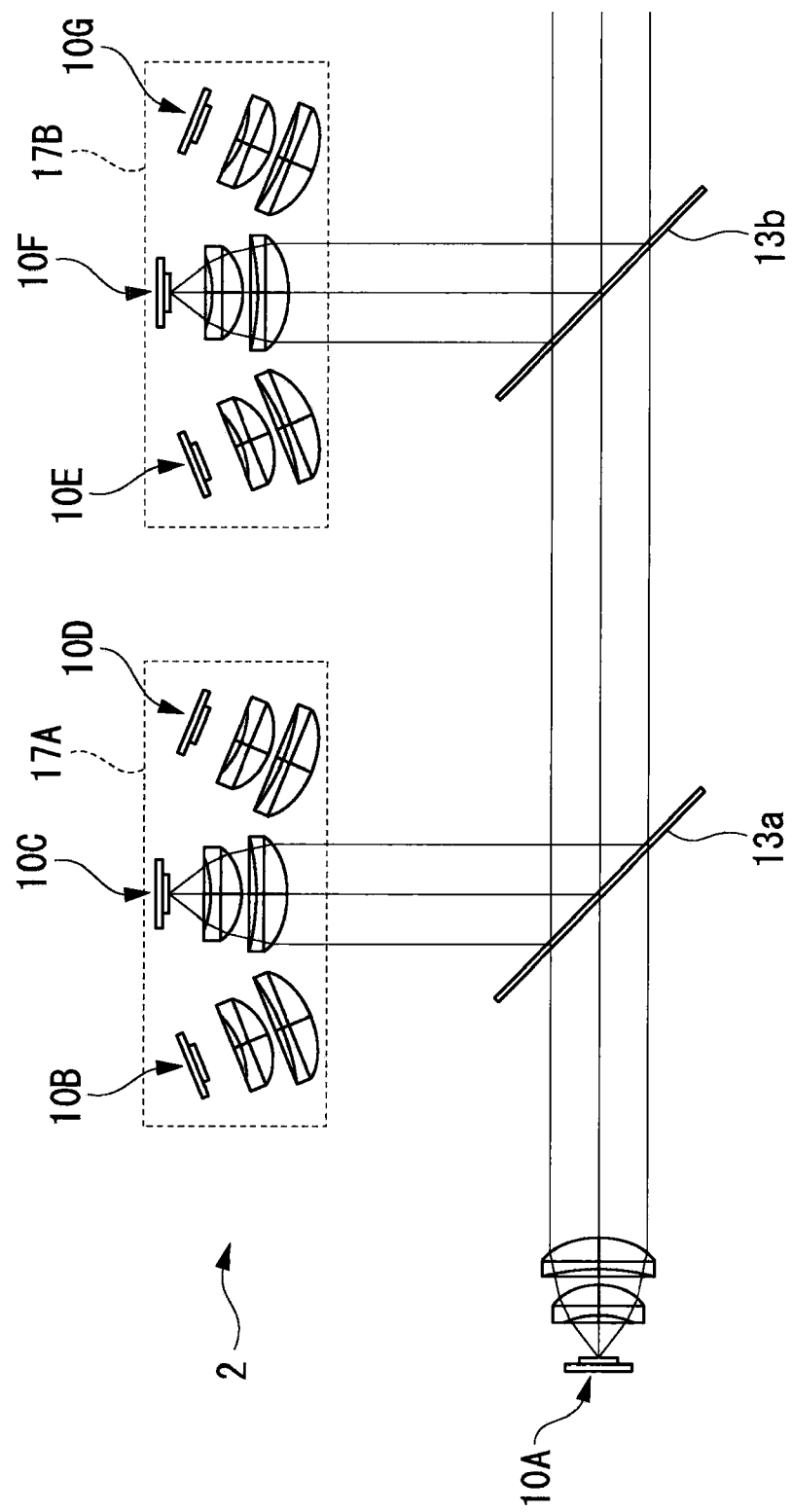
FIG. 13 illustrates an aspect where the dichroic mirror rotates when the synthesized light is generated in the illumination apparatus according to the second embodiment.

FIG. 13 illustrates an example of a case where a synthesized light of the light from the light source 10A and the lights from the light source 10C and the light source 10F is generated, in which both the dichroic mirrors 13a and 13b are inclined by 45°. The optical characteristics of the dichroic mirrors 13a and 13b are as illustrated in FIG. 15(E) and FIG. 16(E).

Accordingly, the light from the light source 10A is transmitted through the dichroic mirror 13a and then transmitted through the dichroic mirror 13b, while the light from the light source 10F is reflected by the dichroic mirror 13a and then transmitted through the dichroic mirror 13b and the light from the light source 10E is reflected by the dichroic mirror 13b, and thereby the synthesized light is generated.

Figure 14:
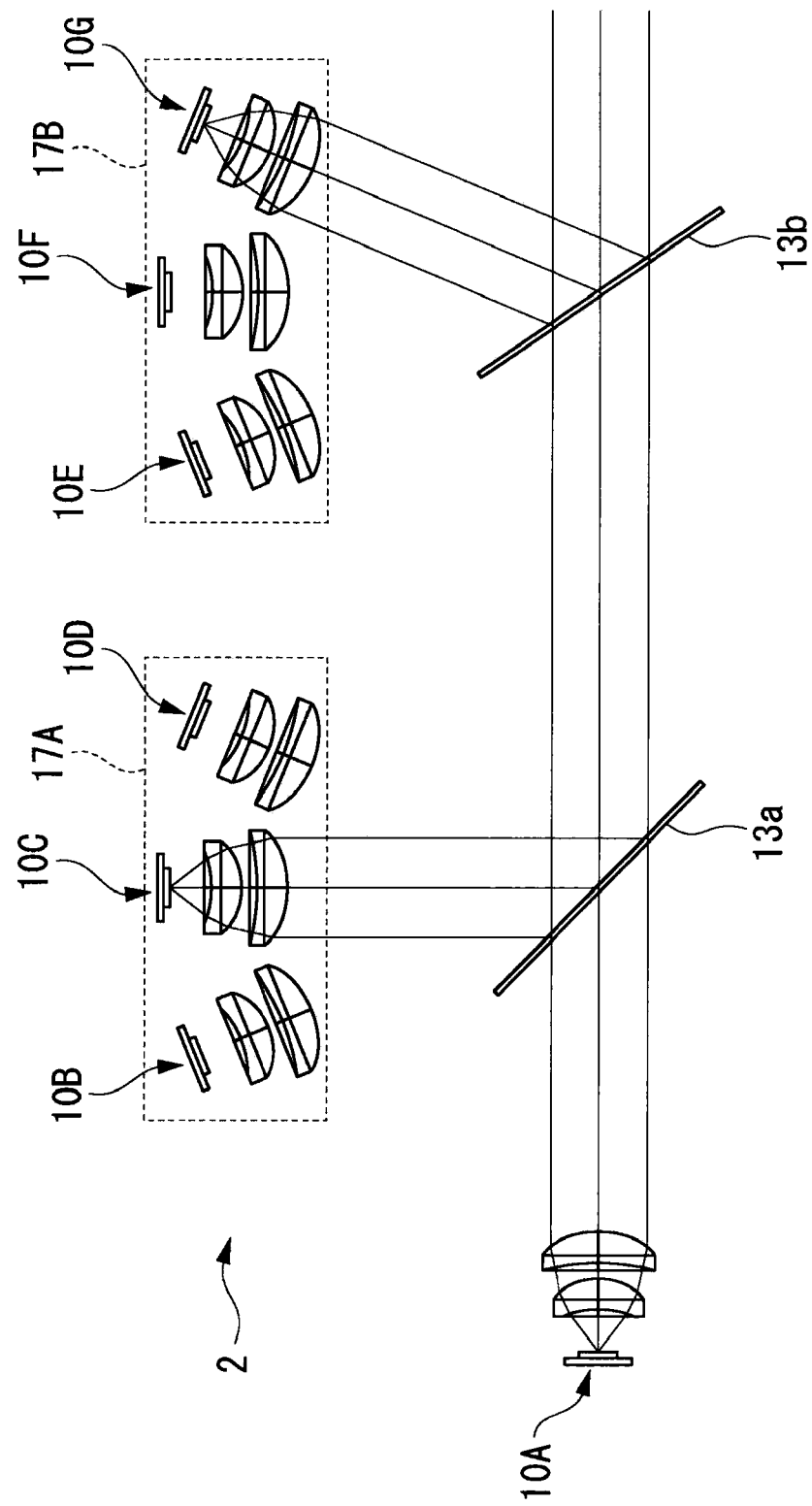
FIG. 14 illustrates an aspect where the dichroic mirror rotates when the synthesized light is generated in the illumination apparatus according to the second embodiment.
Figure 15:
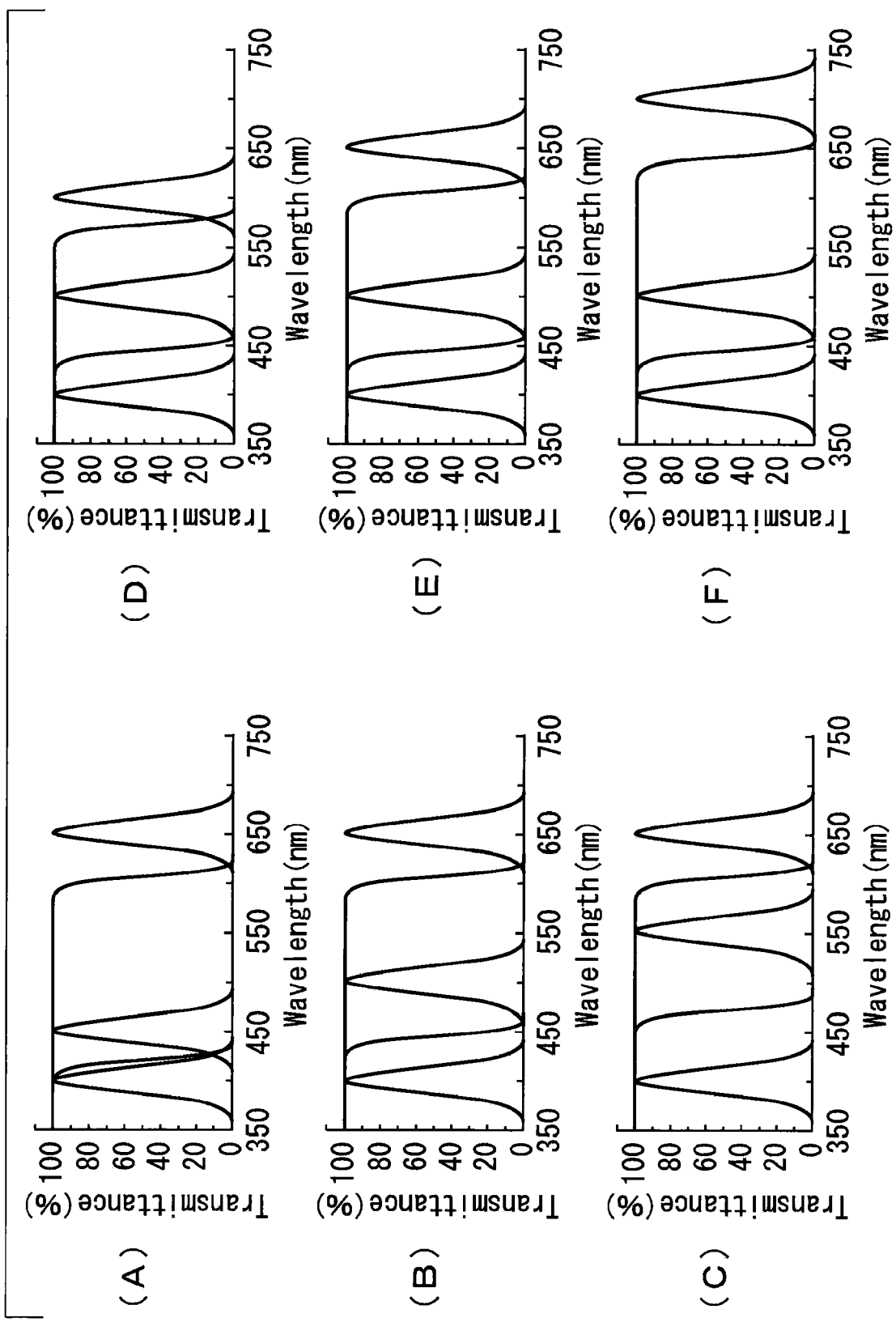
FIG. 15 illustrates transmittance characteristics of the dichroic mirror in the illumination apparatus according to the second embodiment.
Figure 16:
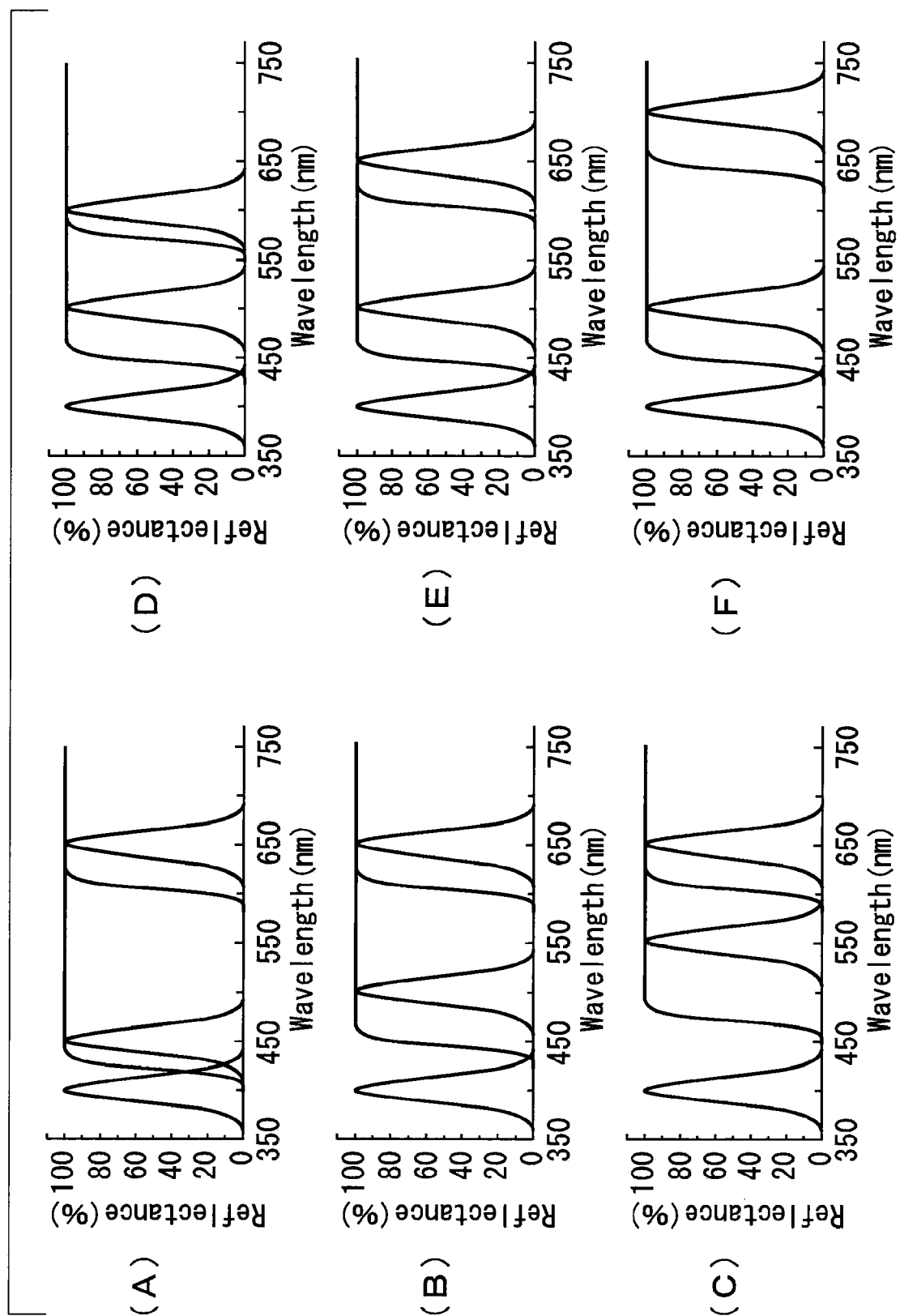
FIG. 16 illustrates reflectance characteristics of the dichroic mirror in the illumination apparatus according to the second embodiment.

FIG. 14 illustrates an example of a case where a synthesized light of the light from the light source 10A and the lights from the light source 10C and the light source 10G is generated, in which the dichroic mirror 13a is inclined by 45° and the dichroic mirror 13b rotates clockwise by 11.25° from a state where the dichroic mirror 13b is inclined by 45°. The optical characteristics of the dichroic mirrors 13a and 13b are as illustrated in FIG. 15(F) and FIG. 16(F).

Accordingly, the light from the light source 10A is transmitted through the dichroic mirror 13a and then transmitted through the dichroic mirror 13b, while the light from the light source 10C is reflected by the dichroic mirror 13a and then transmitted through the dichroic mirror 13b and the light from the light source 10G is reflected by the dichroic mirror 13b, and thereby the synthesized light is generated.

Modification of Second Embodiment

An illumination apparatus 3 according to modification of the second embodiment will be described below with reference to the drawings.

Figure 17:
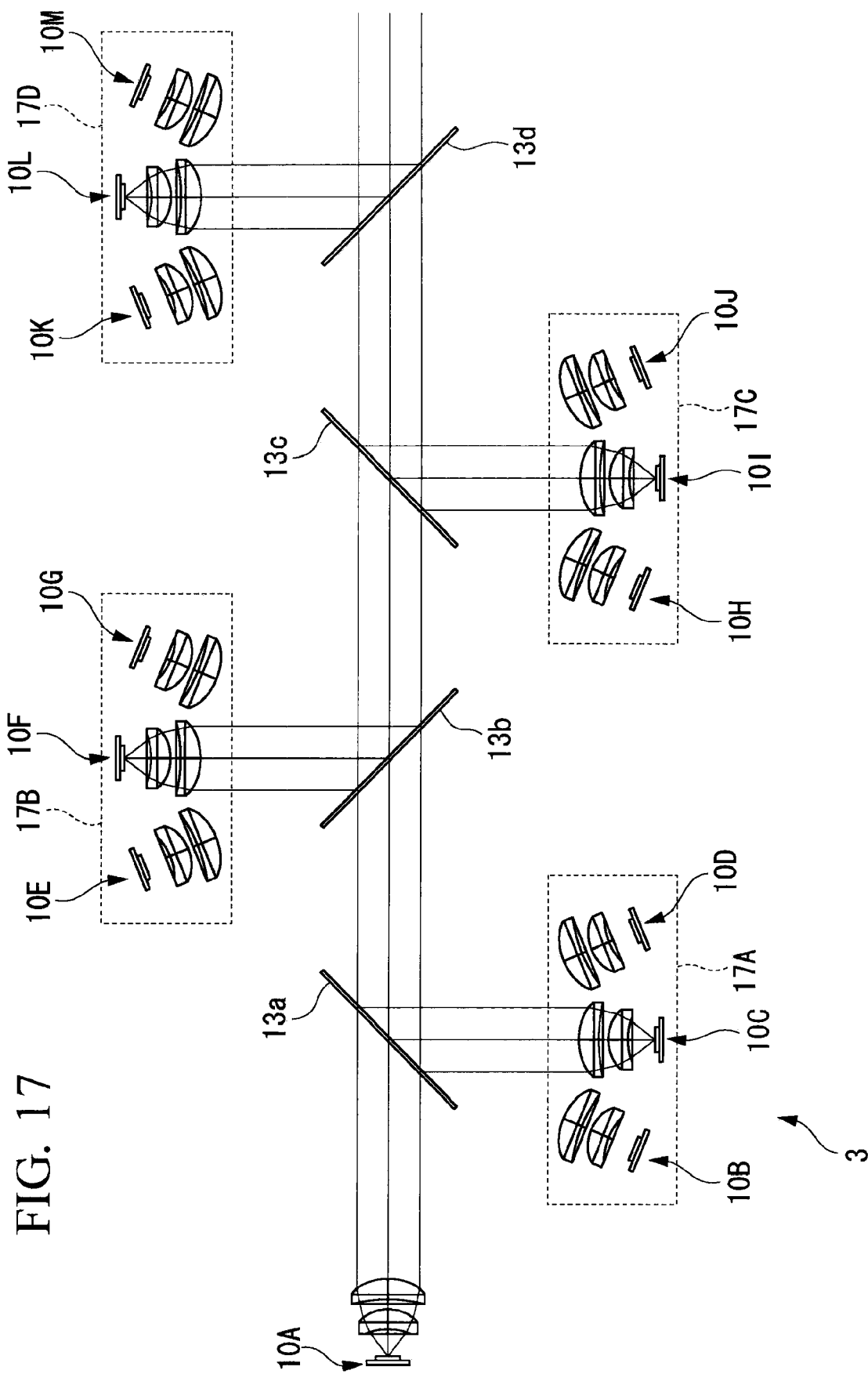
FIG. 17 is a schematic configuration diagram of an illumination apparatus according to modification of the second embodiment.

As illustrated in FIG. 17, the illumination apparatus 3 according to this modification includes a light source unit including four light source groups, four dichroic mirrors 13a, 13b, 13c and 13d and rotating mechanisms 14a and 14b which rotate the dichroic mirrors 13a, 13b, 13c and 13d. It should be noted that this embodiment will be described assuming that the dichroic mirrors 13a, 13b, 13c and 13d have short-path characteristics.

The light source unit of the illumination apparatus 3 includes a light source 10A and light source groups 17A, 17B, 17C and 17D, and light sources configuring the light source groups 17A, 17B, 17C and 17D are respectively disposed in circular shapes so that lights from the light sources configuring the light source groups 17A, 17B, 17C and 17D intersect at the respective centers of the circular shapes. The light source 10A and the light source groups 17A, 17B, 17C and 17D are disposed so that optical paths of the light sources configuring the light source groups 17A, 17B, 17C and 17D respectively intersect on an optical path of the light from the light source 10A. Further, the dichroic mirrors 13a, 13b, 13c and 13d are located at respective positions where the optical paths of the light sources intersect.

More specifically, in FIG. 17, the light source 10A which emits a light of a wavelength of 400 nm is disposed at a left end. The light source group 17A has light sources 10B, 10C and 10D which are disposed in a circular shape around the position of the dichroic mirror 13a. In FIG. 17, the light source 10B is disposed to be inclined clockwise by 67.5° in an optical path direction of the light source 10A with respect to the light source 10A. The light source 10C is disposed to be inclined clockwise by 22.5° in an optical path direction of the light source 10A with respect to the light source 10B, and the light source 10D is disposed to be inclined clockwise by 22.5° in an optical path direction of the light source 10A with respect to the light source 10C. It should be noted that the light source 10B emits a light of a wavelength of 430 nm, the light source 10C emits a light of a wavelength of 460 nm, and the light source 10D emits a light of a wavelength of 490 nm.

The light source group 17B has light sources 10E, 10F and 10G which are disposed in a circular shape around the position of the dichroic mirror 13b. In FIG. 17, the light source 10E is disposed to be inclined anticlockwise by 67.5° in the optical path direction of the light source 10A with respect to the light source 10A. The light source 10F is disposed to be inclined anticlockwise by 22.5° in the optical path direction of the light source 10A with respect to the light source 10E, and the light source 10G is disposed to be inclined anticlockwise by 22.5° in the optical path direction of the light source 10A with respect to the light source 10F. It should be noted that the light source 10E emits a light of a wavelength of 520 nm, the light source 10F emits a light of a wavelength of 550 nm, and the light source 10G emits a light of a wavelength of 580 nm.

The light source group 17C has light sources 10H, 10I and 10J which are disposed in a circular shape around the position of the dichroic mirror 13c. In FIG. 17, the light source 10H is disposed to be inclined clockwise by 67.5° in the optical path direction of the light source 10A with respect to the light source 10A. The light source 10I is disposed to be inclined clockwise by 22.5° in the optical path direction of the light source 10A with respect to the light source 10H, and the light source 10J is disposed to be inclined clockwise by 22.5° in the optical path direction of the light source 10A with respect to the light source 10H. It should be noted that the light source 10H emits a light of a wavelength of 610 nm, the light source 10I emits a light of a wavelength of 640 nm, and the light source 10J emits a light of a wavelength of 670 nm.

The light source group 17D has light sources 10K, 10L and 10M which are disposed in a circular shape around the position of the dichroic mirror 13d. In FIG. 17, the light source 10K is disposed to be inclined anticlockwise by 67.5° in the optical path direction of the light source 10A with respect to the light source 10A. The light source 10L is disposed to be inclined anticlockwise by 22.5° in the optical path direction of the light source 10A with respect to the light source 10K, and the light source 10M is disposed to be inclined anticlockwise by 22.5° in the optical path direction of the light source 10A with respect to the light source 10L. It should be noted that the light source 10K emits a light of a wavelength of 700 nm, the light source 10L emits a light of a wavelength of 730 nm, and the light source 10M emits a light of a wavelength of 760 nm.

Third Embodiment

An illumination apparatus 4 according to a third embodiment will be described below with reference to the drawings.

In the illumination apparatus 4 according to this embodiment, light sources are not disposed in a circular shape as in the above-described embodiments, but light sources 10B, 10C and 10D are disposed on a straight line.

Figure 18:
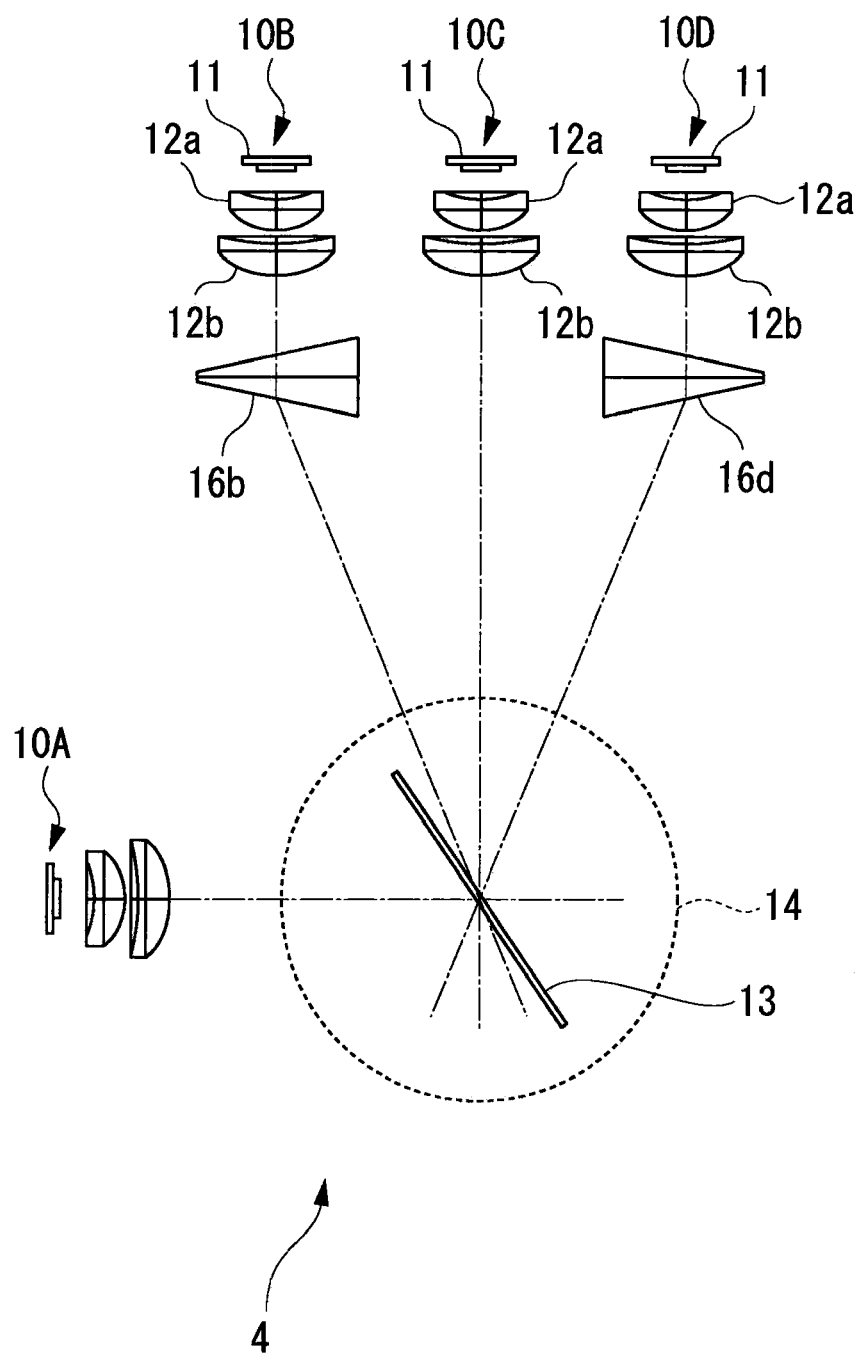
FIG. 18 is a schematic configuration diagram of an illumination apparatus according to a third embodiment.

Specifically, in FIG. 18, a light source 10A which emits a light of 400 nm that is transmitted through a dichroic mirror 13 having short-path characteristics is disposed at a left end, and the light sources 10B, 10C and 10D are disposed at equal intervals so as to be orthogonal to an optical path of the light source 10A. The light source 10B and the light source 10D have prisms 16b and 16d as optical path changing members, and a light from the light source 10B and a light from the light source 10D intersect at the same position as an optical path from the light source 10C respectively by way of the prism 16b and the prism 16d. The positions where the lights intersect are located on the optical path of the light from the light source 10A.

It should be noted that the light source 10B emits a light of a wavelength of 450 nm, the light source 10C emits a light of a wavelength of 500 nm, and the light source 10D emits a light of a wavelength of 550 nm.

Figure 19:
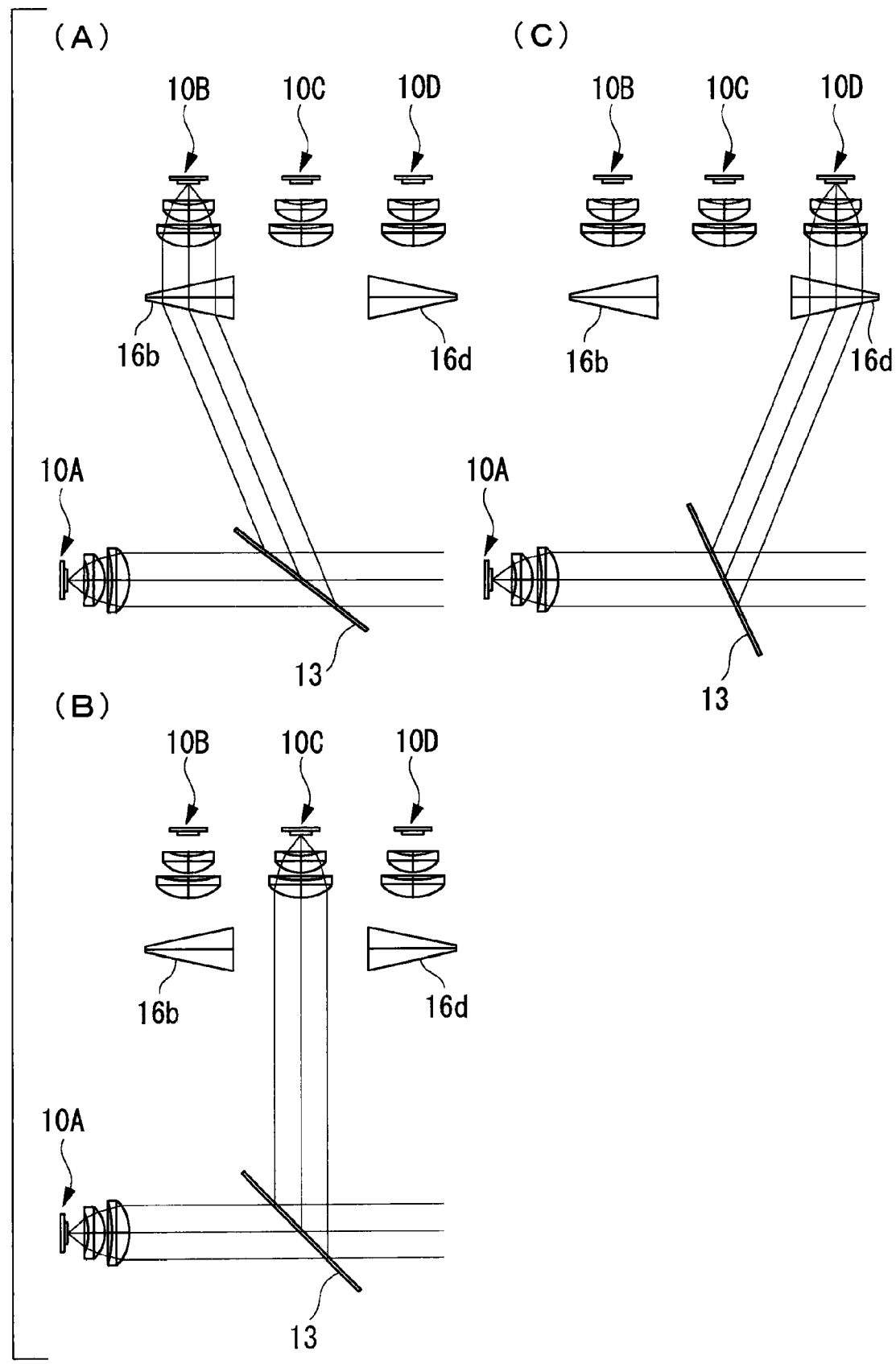
FIG. 19 illustrates an aspect where a dichroic mirror rotates when a synthesized light is generated in the illumination apparatus according to the third embodiment.

A case where in the illumination apparatus 4 configured as described above, for example, a synthesized light of the light from the light source 10A and a light selected from the lights from the light sources 10B, 10C and 10D is generated and radiated will be described with reference to FIG. 19. It is assumed here that the lights from the light source 10B and the light source 10D enter the dichroic mirror 13 while being inclined by 22.5° with respect to the light from the light source 10C by way of the prisms 16b and 16d.

FIG. 19(A) illustrates an example of a case where a synthesized light of the light from the light source 10A and the light from the light source 10B is generated, in which the dichroic mirror 13 rotates anticlockwise by 22.5° from a state where the dichroic mirror 13 is inclined by 45°. The optical characteristics of the dichroic mirror at this time are as illustrated in FIG. 15(A) and FIG. 16(A). Accordingly, the light from the light source 10A is transmitted through the dichroic mirror 13, while the light from the light source 10B is reflected by the dichroic mirror 13, and thereby the synthesized light is generated.

FIG. 19(B) illustrates an example where a synthesized light of the light from the light source 10A and the light from the light source 10C is generated, in which the dichroic mirror 13 rotates anticlockwise by 11.25° from a state where the dichroic mirror 13 is inclined by 45°. The optical characteristics of the dichroic mirror 13 at this time are as illustrated in FIG. 15(B) and FIG. 16(B). Accordingly, the light from the light source 10A is transmitted through the dichroic mirror 13, while the light from the light source 10C is reflected by the dichroic mirror 13, and thereby the synthesized light is generated.

FIG. 19(C) illustrates an example where a synthesized light of the light from the light source 10A and the light from the light source 10D is generated, in which the dichroic mirror 13 is inclined by 45°. The optical characteristics of the dichroic mirror 13 are as illustrated in FIG. 15(C) and FIG. 16(C). Accordingly, the light from the light source 10A is transmitted through the dichroic mirror, while the light from the light source 10D is reflected by the dichroic mirror, and thereby illumination is performed with the synthesized light while color is synthesized.

Modification of Third Embodiment

An illumination apparatus 5 according to modification of the third embodiment will be described below with reference to the drawings.

This embodiment describes an example where the light sources are arranged on a straight line and two light source groups comprised of three light sources disposed on a straight line are provided as in the above-described third embodiment.

Figure 20:
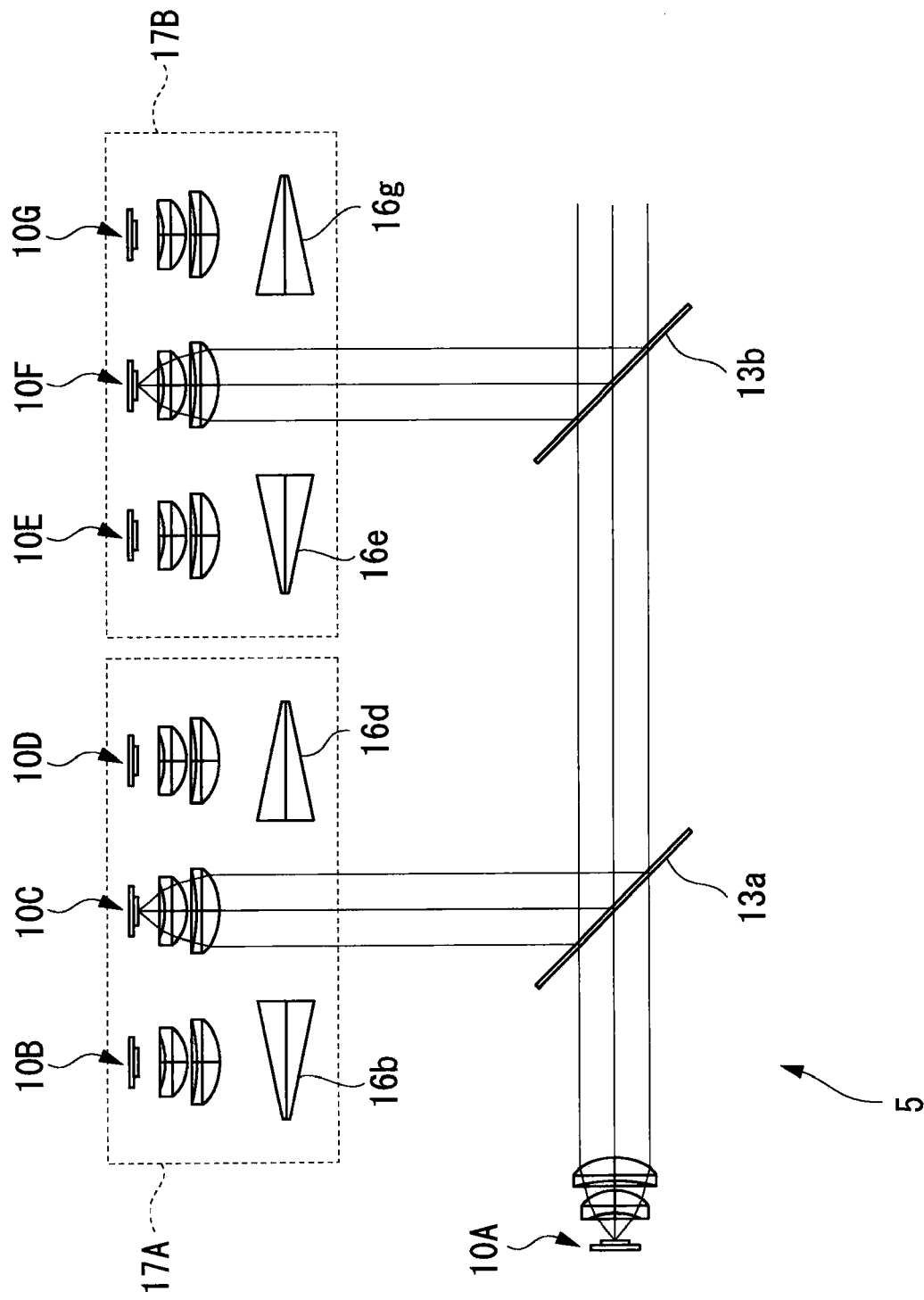
FIG. 20 is a schematic configuration diagram of an illumination apparatus according to modification of the third embodiment.

Specifically, in FIG. 20, a light source 10A which emits a light of 400 nm that is transmitted through dichroic mirrors 13a and 13b having short-path characteristics is disposed at a left end, and a light source group 17A comprised of light sources 10B, 10C and 10D and a light source group 17B comprised of light sources 10E, 10F and 10G are disposed at equal intervals so as to be orthogonal to an optical path of the light source 10A.

The light sources 10B, 10D, 10E and 10G have prisms 16b, 16d, 16e and 16f as optical path changing members, a light from the light source 10B and a light from the light source 10D intersect at the same position as an optical path of a light from the light source 10C respectively by way of the prism 16b and the prism 16d. In a similar manner, a light from the light source 10E and a light from the light source 10G intersect at the same position as the optical path of the light from the light source 10C respectively by way of the prism 16e and the prism 16g. The positions where the lights intersect are located on an optical path of a light from the light source 10A.

It should be noted that the light source 10B emits a light of a wavelength of 450 nm, the light source 10C emits a light of a wavelength of 500 nm, the light source 10D emits a light of a wavelength of 550 nm, the light source 10D emits a light of a wavelength of 600 nm, the light source 10E emits a light of a wavelength of 650 nm, and the light source 10G emits a light of a wavelength of 700 nm.

While an LED is applied as a light emitting device in the above-described embodiments, the light emitting device is not limited to this, and, for example, an LD, a lamp, or the like can be applied. Further, while a dichroic mirror is applied as an optical device, the optical device is not limited to this, and, for example, a dichroic prism, or the like can be also applied.

In this way, by providing a dichroic mirror so as to be able to rotate, it is possible to arrange light sources in various manners. While the light from the light source 10A is transmitted through the dichroic mirror 13 and passes through the transmission optical path which goes straight, when the rotation angle of the dichroic mirror 13 is adjusted by the rotating mechanism, a light from one of the other light sources 10B, 10C, 10D and the like is reflected by the dichroic mirror 13 and enters the transmission optical path of the light from the light source 10A. When the rotation angle of the dichroic mirror 13 is switched by the rotating mechanism 14, it is possible to switch the light source which emits a light entering the transmission optical path. That is, it is possible to make the lights from three or more light sources 10A, 10B, 10C, 10D, and the like enter one optical path with one dichroic mirror 13, so that it is possible to suppress loss of lights upon transmission or reflection of the lights. Accordingly, it is possible to radiate a light with higher luminance by appropriately selecting lights of a plurality of different wavelengths while improving light guiding efficiency.

On the basis of the embodiment described above, inventions as follows are derived.

One aspect of the present invention provides an illumination apparatus including three or more light sources which are arranged so that optical axes of light sources intersect at one point and which respectively emit lights of different wavelength ranges, an optical device which transmits a light from one of the light sources, while reflecting lights from the other light sources so as to make the lights enter an optical path of the light from the one of the light sources, and an optical device rotator which rotates the optical device in a direction in which the light sources are arranged.

According to this aspect, the light from the one of the light sources is transmitted through the optical device and passes through a transmission optical path which goes straight. Meanwhile, by adjusting a rotation angle of the optical device rotated by the optical device rotator by way of actuation of a control means, a light from one of the other light sources is reflected by the optical device and enters the transmission optical path. By switching the rotation angle of the optical device by way of the optical device rotator, the light source which emits a light entering the transmission optical path can be switched. That is, it is possible to make the lights from three or more light sources enter the same optical path with a single optical device, so that it is possible to suppress loss of the lights upon transmission or reflection of the lights. Accordingly, it is possible to radiate a light with higher luminance by appropriately selecting lights of a plurality of different wavelengths while improving light guiding efficiency.

It should be noted that by providing a control means for controlling the rotation angle of the optical device rotated by the optical device rotator, it is possible to appropriately adjust the rotation angle of the optical device to a desired angle.

In the above-described aspect, a plurality of light sources are preferably disposed in a circular shape and the optical device is preferably disposed at the center of the plurality of light sources disposed in the circular shape.

With this configuration, distances from the optical device to the light sources become equal, so that it is possible to easily control the rotation angle of the optical device.

In the above-described aspect, the plurality of light sources are preferably disposed at equal intervals.

With this configuration, the positions of the light sources with respect to the optical device can be easily recognized, so that it is possible to easily control the rotation angle of the optical device.

Advantageous Effects of Invention

According to the present invention, it is possible to provide an advantageous effect of radiating a light with higher luminance by appropriately selecting lights of a plurality of different wavelengths while improving light guiding efficiency.

REFERENCE SIGNS LIST 1, 2, 3, 4, 5 Illumination apparatus
10A, 10B, 10C, 10D, 10E, 10F, 10G, 10H, 10I, 10J, 10K, 10L and
10M Light source
11 Light emitting device
12a, 12b Collimator lens
13a, 13b, 13c, 13d Dichroic mirror
14 Rotating mechanism
16b, 16d, 16e, 16g Prism
17A, 17B, 17C, 17D Light source group

The invention claimed is:
1. An illumination apparatus comprising:
   four or more light sources which are arranged so that optical axes of the light sources intersect at one point and which respectively emit lights of different wavelength ranges;
   an optical device which transmits a light from a first light source among the light sources, while reflecting lights from other light sources among the light sources other than the first light source so as to make the lights from the other light sources enter an optical path of the light from the first light source; and
   an optical device rotator which rotates the optical device in a direction in which the light sources are arranged, wherein the other light sources are disposed so that angles of incidence of the lights from the other light sources to the optical device are different from each other when the optical device reflects the lights from the other light sources to make the lights enter the optical path of the light from the first light source, a wavelength of the light from the first light source is shorter than any wavelengths of the lights from the other light sources, the other light sources are disposed so that the wavelength of each of the other light sources is shorter as the angle of incidence of the light therefrom to the optical device is larger, and the optical device has transmission characteristics which shift to a longer wavelength side according to an increase of the angle of incidence.

2. The illumination apparatus according to claim 1, wherein the other light sources are disposed in a circular shape, and the optical device is disposed at the center of the other light sources disposed in the circular shape.

3. The illumination apparatus according to claim 1, wherein the other light sources are disposed at equal intervals.

4. The illumination apparatus according to claim 2, wherein the other light sources are disposed at equal intervals.

5. The illumination apparatus according to claim 1, wherein the optical device makes the lights from the other light sources selectively enter the optical path of the light from the first light source.

6. The illumination apparatus according to claim 2, wherein the optical device makes the lights from the other light sources selectively enter the optical path of the light from the first light source.

7. The illumination apparatus according to claim 3, wherein the optical device makes the lights from the other light sources selectively enter the optical path of the light from the first light source.

8. The illumination apparatus according to claim 1, wherein the optical device makes only a light from one direction among the lights from the other light sources enter the optical path of the light from the first light source.

9. The illumination apparatus according to claim 2, wherein the optical device makes only a light from one direction among the lights from the other light sources enter the optical path of the light from the first light source.

10. The illumination apparatus according to claim 3, wherein the optical device makes only a light from one direction among the lights from the other light sources enter the optical path of the light from the first light source.

11. The illumination apparatus according to claim 5, wherein the optical device makes only a light from one direction among the lights from the other light sources enter the optical path of the light from the first light source.

12. The illumination apparatus according to claim 1, wherein the optical device rotator has a rotation axis in a direction perpendicular to a plane including an optical axis of the first light source and optical axes of the other light sources.

13. The illumination apparatus according to claim 2, wherein the optical device rotator has a rotation axis in a direction perpendicular to a plane including an optical axis of the first light source and optical axes of the other light sources.

14. The illumination apparatus according to claim 3, wherein the optical device rotator has a rotation axis in a direction perpendicular to a plane including an optical axis of the first light source and optical axes of the other light sources.

15. The illumination apparatus according to claim 5, wherein the optical device rotator has a rotation axis in a direction perpendicular to a plane including an optical axis of the first light source and optical axes of the other light sources.

16. The illumination apparatus according to claim 8, wherein the optical device rotator has a rotation axis in a direction perpendicular to a plane including an optical axis of the first light source and optical axes of the other light sources.

17. An illumination apparatus comprising:

four or more light sources which are arranged so that optical axes of the light sources intersect at one point and which respectively emit lights of different wavelength ranges;

an optical device which transmits a light from a first light source among the light sources, while reflecting lights from other light sources among the light sources other than the first light source so as to make the lights from the other light sources enter an optical path of the light from the first light source; and an optical device rotator which rotates the optical device in a direction in which the light sources are arranged, wherein the other light sources are disposed so that angles of incidence of the lights from the other light sources to the optical device are different from each other when the optical device reflects the lights from the other light sources to make the lights enter the optical path of the light from the first light source, a wavelength of the light from the first light source is longer than any wavelengths of the lights from the other light sources, the other light sources are disposed so that the wavelength of each of the other light sources is shorter as the angle of incidence of the light therefrom to the optical device is larger, and the optical device has reflectance characteristics which shift to a longer wavelength side according to an increase of the angle of incidence.

18. An illumination apparatus comprising:

three or more light sources which are arranged so that optical axes of the light sources intersect at one point and which respectively emit lights of different wavelength ranges;

an optical device which transmits a light from a first light source among the light sources, while reflecting lights from other light sources among the light sources other than the first light source so as to make the lights from the other light sources enter an optical path of the light from the first light source; and an optical device rotator which rotates the optical device in a direction in which the light sources are arranged, wherein the other light sources are disposed so that angles of incidence of the lights from the other light sources to the optical device are different from each other when the optical device reflects the lights from the other light sources to make the lights enter the optical path of the light from the first light source, a wavelength of the light from the first light source is shorter than any wavelengths of the lights from the other light sources, the other light sources are disposed so that the wavelength of each of the other light sources is shorter as the angle of incidence of the light therefrom to the optical device is larger, and the optical device has transmission characteristics which shift to a longer wavelength side according to an increase of the angle of incidence.

19. An illumination apparatus comprising:

three or more light sources which are arranged so that optical axes of the light sources intersect at one point and which respectively emit lights of different wavelength ranges;

an optical device which transmits a light from a first light source among the light sources, while reflecting lights from other light sources among the light sources other than the first light source so as to make the lights from the other light sources enter an optical path of the light from the first light source; and an optical device rotator which rotates the optical device in a direction in which the light sources are arranged, wherein the other light sources are disposed so that angles of incidence of the lights from the other light sources to the optical device are different from each other when the optical device reflects the lights from the other light sources to make the lights enter the optical path of the light from the first light source, a wavelength of the light from the first light source is longer than any wavelengths of the lights from the other light sources, the other light sources are disposed so that the wavelength of each of the other light sources is shorter as the angle of incidence of the light therefrom to the optical device is larger, and the optical device has reflectance characteristics which shift to a longer wavelength side according to an increase of the angle of incidence.

* * * * *